(12) United States Patent
Sonoda

(10) Patent No.: US 11,695,700 B2
(45) Date of Patent: Jul. 4, 2023

(54) INFORMATION PROCESSING APPARATUS, COMPUTER-READABLE RECORDING MEDIUM STORING OVERLOAD CONTROL PROGRAM, AND OVERLOAD CONTROL METHOD

(71) Applicant: FUJITSU LIMITED, Kawasaki (JP)

(72) Inventor: Masataka Sonoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/565,565

(22) Filed: Dec. 30, 2021

(65) Prior Publication Data
US 2022/0345407 A1 Oct. 27, 2022

(30) Foreign Application Priority Data

Apr. 22, 2021 (JP) ................................ 2021-072375

(51) Int. Cl.
*H04L 47/10* (2022.01)
*H04L 47/125* (2022.01)
*H04L 47/122* (2022.01)
*H04L 47/2483* (2022.01)

(52) U.S. Cl.
CPC .......... *H04L 47/125* (2013.01); *H04L 47/122* (2013.01); *H04L 47/2483* (2013.01)

(58) Field of Classification Search
CPC . H04L 47/125; H04L 47/122; H04L 47/2483; H04L 41/08; H04L 41/0897; H04L 45/38; H04L 47/70; H04L 49/70; H04L 67/10; H04L 67/52; H04W 36/30
See application file for complete search history.

(56) References Cited

U.S. PATENT DOCUMENTS

| | | | | |
|---|---|---|---|---|
| 10,397,117 | B2* | 8/2019 | Larose | H04L 47/125 |
| 11,102,139 | B1* | 8/2021 | Deng | H04L 47/70 |
| 2011/0320632 | A1* | 12/2011 | Karino | H04L 45/38 |
| | | | | 709/238 |
| 2016/0262078 | A1* | 9/2016 | Yao | H04W 36/30 |
| 2016/0285780 | A1* | 9/2016 | Strijkers | H04L 47/70 |
| 2016/0366023 | A1* | 12/2016 | Higgins | H04L 67/52 |
| 2018/0109471 | A1* | 4/2018 | Chang | H04L 49/70 |
| 2019/0124013 | A1* | 4/2019 | Murugesan | H04L 45/38 |

(Continued)

FOREIGN PATENT DOCUMENTS

| | | |
|---|---|---|
| JP | 2016-510524 A | 4/2016 |
| WO | WO 2014/105650 A1 | 7/2014 |
| WO | WO 2020/122024 A1 | 6/2020 |

*Primary Examiner* — Dustin Nguyen
(74) *Attorney, Agent, or Firm* — Staas & Halsey LLP

(57) ABSTRACT

An information processing apparatus equipped with a network interface card, the network interface card comprising: a network switch; and a first processor configured to perform processing, the processing including: recording, for each application, communication information to each application executed in the computer; comparing, in a case where a use rate of the processor is overloaded, a load on each network function that processes communication to each application based on a flow rule of the network switch, based on a record of the communication information; selecting a network function having the smallest load on each network function; and switching an execution position of the selected network function to a network function of the computer to change the flow rule of the network switch.

6 Claims, 22 Drawing Sheets

(56) References Cited

U.S. PATENT DOCUMENTS

| | | | |
|---|---|---|---|
| 2019/0200400 A1* | 6/2019 | Liu | H04L 41/0897 |
| 2020/0099628 A1* | 3/2020 | Parikh | H04L 47/6255 |
| 2020/0177660 A1* | 6/2020 | Connor | H04L 69/321 |
| 2020/0278892 A1* | 9/2020 | Nainar | H04L 67/10 |
| 2021/0144094 A1* | 5/2021 | Limaye | H04L 47/125 |
| 2022/0131945 A1* | 4/2022 | Sapra | H04L 41/08 |
| 2022/0210685 A1* | 6/2022 | Keshishoglou | H04L 47/125 |

* cited by examiner

FIG. 3

| COMMUNICATION TIME | TRANSMISSION SOURCE IP | DESTINATION IP | PACKET SIZE |
|---|---|---|---|
| 12.21.2020 20:00:00.001 | x.x.x.x | IP(Poda) | 1500B |
| 12.21.2020 20:00:00.002 | y.y.y.y | IP(Podb) | 1400B |
| 12.21.2020 20:00:00.004 | z.z.z.z | IP(Podc) | 150B |
| ... | ... | ... | ... |

| TARGET APP (IP) | COMMUNICATION RECORD FOR EACH CONTINUATION PERIOD ||| DISTRIBUTION BY PACKET SIZE (Byte) (%) ||||||| 32 |
| --- | --- | --- | --- | --- | --- | --- | --- | --- | --- | --- |
| | START TIME | END TIME | NUMBER OF PACKETS | 1-300 | 301-600 | 601-900 | 901-1200 | 1201-1500 | 1501- | |
| IP (Poda) | 20:00:00.001 | 20:00:30.001 | 5,000 | 0 | 10 | 15 | 15 | 60 | 0 | |
| | 20:04:20.055 | 20:04:50.055 | 5,100 | 0 | 0 | 10 | 10 | 80 | 0 | |
| | ... | ... | ... | ... | ... | ... | ... | ... | ... | |
| IP (Podb) | 20:01:15.003 | 20:02:45.003 | 6,000 | 0 | 0 | 50 | 30 | 20 | 0 | |
| | ... | ... | ... | ... | ... | ... | ... | ... | ... | |
| IP (Podc) | 20:00:30.003 | 20:00:45.003 | 1,500 | 20 | 30 | 30 | 10 | 10 | 0 | |
| | 20:02:00.091 | 20:02:15.091 | 1,450 | 30 | 30 | 30 | 5 | 5 | 0 | |
| | 20:03:31.007 | 20:03:46.007 | 1,500 | 20 | 30 | 20 | 20 | 10 | 0 | |
| | ... | ... | ... | ... | ... | ... | ... | ... | ... | |

FIG. 5

| NF TYPE | NF LOAD COEFFICIENT FOR EACH PACKET SIZE ||||||
|---|---|---|---|---|---|---|
| | 1-300 | 301-600 | 601-900 | 901-1200 | 1201-1500 | 1501- |
| DPI | 2.0 | 2.5 | 4.5 | 5.0 | 5.5 | 10.0 |
| LB | 2.0 | 2.0 | 2.0 | 2.0 | 2.0 | 2.0 |
| ... | ... | ... | ... | ... | ... | ... |

FIG. 6

| INSTANCE ID | TARGET DEVICE ID | EXECUTION LOCATION | ACTIVATION INFORMATION |
|---|---|---|---|
| nfi0001 | NF001 | SmartNIC | proc(pid=001) |
| nfi0002 | NF002 | SmartNIC | proc(pid=002) |
| nfi0003 | NF003 | SmartNIC | proc(pid=003) |
| nfi0004 | NF004 | SmartNIC | proc(pid=004) |
| nfi0005 | NF005 | SmartNIC | proc(pid=005) |
| nfi1001 | NF001 | Host | proc(pid=101) |
| nfi1002 | NF002 | Host | proc(pid=102) |
| nfi1003 | NF003 | Host | proc(pid=103) |
| nfi1004 | NF004 | Host | proc(pid=104) |
| nfi1005 | NF005 | Host | proc(pid=105) |

FIG. 7

| FUNCTION ID | TARGET App (IP ADDRESS) | FUNCTION TYPE | EXECUTION INSTANCE ID |
|---|---|---|---|
| NF001 | IP(Podb) | DPI | nfi0001 |
| NF002 | IP(Poda) | DPI | nfi0002 |
| NF003 | IP(Podc) | LB | nfi1003 |
| NF004 | IP(Podb) | LB | nfi0004 |
| NF005 | IP(Poda) | LB | nfi0005 |

FIG. 11

COMMUNICATION RECORD INFORMATION (31)

| COMMUNICATION TIME | TRANSMISSION SOURCE IP | DESTINATION IP | PACKET SIZE |
|---|---|---|---|
| 12.21.2020 20:00:00.001 | x.x.x.x | IP(Poda) | 1500B |
| 12.21.2020 20:00:00.002 | y.y.y.y | IP(Podb) | 1400B |
| 12.21.2020 20:00:00.004 | z.z.z.z | IP(Podc) | 150B |
| ... | ... | ... | ... |

COMMUNICATION STATISTICS INFORMATION (32)

| TARGET APP (IP) | COMMUNICATION RECORD FOR EACH CONTINUATION PERIOD | | NUMBER OF PACKETS | DISTRIBUTION BY PACKET SIZE (Byte) (%) | | | | | |
|---|---|---|---|---|---|---|---|---|---|
| | START TIME | END TIME | | 1-300 | 301-600 | 601-900 | 901-1200 | 1201-1500 | 1501- |
| IP(Poda) | 20:00:00.001 | 20:00:30.001 | 5,000 | 0 | 10 | 15 | 15 | 60 | 0 |
| | 20:04:20.055 | 20:04:50.055 | 5,100 | 0 | 0 | 10 | 10 | 80 | 0 |
| | ... | ... | ... | ... | ... | ... | ... | ... | ... |
| IP(Podb) | 20:01:15.003 | 20:02:45.003 | 6,000 | 0 | 0 | 50 | 30 | 20 | 0 |
| | ... | ... | ... | ... | ... | ... | ... | ... | ... |
| IP(Podc) | 20:00:30.003 | 20:00:45.003 | 1,500 | 20 | 30 | 30 | 10 | 10 | 0 |
| | 20:02:00.091 | 20:02:15.091 | 1,450 | 30 | 30 | 30 | 5 | 5 | 0 |
| | 20:03:31.007 | 20:03:46.007 | 1,500 | 20 | 30 | 20 | 20 | 10 | 0 |
| | ... | ... | ... | ... | ... | ... | ... | ... | ... |

FIG. 13A

CALCULATE BASED ON COMMUNICATION CONTENTS FOR LATEST 5 MINUTES (20: 00: 00 TO 20: 05: 00)

- COMPARISON VALUE OF NF002 (APP: Poda, FUNCTION TYPE: DPI, CONTINUATION TIME: 2 TIMES): 26,080.0
  - LOAD FOR FIRST CONTINUATION TIME (20: 00: 00.001 TO 20: 00: 30.001)
    $[(5000*0.1)*2.5 + (5000*0.15)*4.5 + (5000*0.6)*5.5]*0.5 = 12,437.5$

| NUMBER OF PACKETS WITH SIZE 301-600 | NF LOAD COEFFICIENT WITH SIZE 301-600 | NUMBER OF PACKETS WITH SIZE 601-900 | NF LOAD COEFFICIENT WITH SIZE 601-900 | NUMBER OF PACKETS WITH SIZE 901-1200 | NF LOAD COEFFICIENT WITH SIZE 901-1200 | NUMBER OF PACKETS WITH SIZE 1201-1500 | NF LOAD COEFFICIENT WITH SIZE 1201-1500 | COMMUNICATION CONTINUATION TIME (MIN) |

- LOAD FOR SECOND CONTINUATION TIME (20: 04: 20.055 TO 20: 04: 50.055)
  $[(5100*0.1)*4.5 + (5100*0.1)*5.0 + (5100*0.8)*5.5]*0.5 = 13,642.5$

| NUMBER OF PACKETS WITH SIZE 601-900 | NF LOAD COEFFICIENT WITH SIZE 601-900 | NUMBER OF PACKETS WITH SIZE 901-1200 | NF LOAD COEFFICIENT WITH SIZE 901-1200 | NUMBER OF PACKETS WITH SIZE 1201-1500 | NF LOAD COEFFICIENT WITH SIZE 1201-1500 | COMMUNICATION CONTINUATION TIME (MIN) |

- COMPARISON VALUE OF NF001 = 23,400.0
- COMPARISON VALUE OF NF003 = 1,475.0
- COMPARISON VALUE OF NF004 = 18,000.0
- COMPARISON VALUE OF NF005 = 10,100.0

EXECUTION NF INFORMATION ~35

| FUNCTION ID | TARGET App (IP ADDRESS) | FUNCTION TYPE | EXECUTION (INSTANCE ID) |
|---|---|---|---|
| NF001 | IP(Podb) | DPI | nfi0001 |
| NF002 | IP(Poda) | DPI | nfi0002 |
| NF003 | IP(Podc) | LB | nfi1003 |
| NF004 | IP(Podb) | LB | nfi0004 |
| NF005 | IP(Poda) | LB | nfi0005 |

FIG. 13B

NF LOAD COEFFICIENT INFORMATION (33)

| NF TYPE | NF LOAD COEFFICIENT FOR EACH PACKET SIZE | | | | | |
|---|---|---|---|---|---|---|
| | 1-300 | 301-600 | 601-900 | 901-1200 | 1201-1500 | 1501- |
| DPI | 2.0 | 2.5 | 4.5 | 5.0 | 5.5 | 10.0 |
| LB | 2.0 | 2.0 | 2.0 | 2.0 | 2.0 | 2.0 |
| ... | ... | ... | ... | ... | ... | ... |

COMMUNICATION STATISTICS INFORMATION (32)

| TARGET App (IP) | COMMUNICATION RECORD FOR EACH CONTINUATION PERIOD | | NUMBER OF PACKETS | DISTRIBUTION BY PACKET SIZE (Byte) (%) | | | | | |
|---|---|---|---|---|---|---|---|---|---|
| | START TIME | END TIME | | 1-300 | 301-600 | 601-900 | 901-1200 | 1201-1500 | 1501- |
| IP (Poda) | 20:00:00.001 | 20:00:30.001 | 5,000 | 0 | 0 | 10 | 15 | 60 | 0 |
| | 20:04:20.055 | 20:04:50.055 | 5,100 | 0 | 0 | 0 | 10 | 80 | 0 |
| | ... | ... | ... | ... | ... | ... | ... | ... | ... |
| IP (Podb) | 20:01:15.003 | 20:02:45.003 | 6,000 | 0 | 0 | 50 | 30 | 20 | 0 |
| | 20:00:30.003 | 20:00:45.003 | 1,500 | 20 | 30 | 30 | 10 | 10 | 0 |
| IP (Podc) | 20:02:00.091 | 20:02:15.091 | 1,450 | 30 | 30 | 30 | 5 | 5 | 0 |
| | 20:03:31.007 | 20:03:46.007 | 1,500 | 20 | 30 | 20 | 20 | 10 | 0 |
| | ... | ... | ... | ... | ... | ... | ... | ... | ... |

FIRST → (row 1)
SECOND → (row 2)

FIG. 14B

EXECUTION NF INFORMATION  35

| FUNCTION ID | TARGET App (IP ADDRESS) | FUNCTION TYPE | EXECUTION (INSTANCE ID) |
|---|---|---|---|
| NF001 | IP(Podb) | DPI | nfi0001 |
| NF002 | IP(Poda) | DPI | nfi0002 |
| NF003 | IP(Podc) | LB | nfi0003nfi1003 |
| NF004 | IP(Podb) | LB | nfi0004 |
| NF005 | IP(Poda) | LB | nfi0005 |

NF INSTANCE INFORMATION  34

| INSTANCE ID | TARGET FUNCTION ID | EXECUTION LOCATION | ACTIVATION INFORMATION |
|---|---|---|---|
| nfi0001 | NF001 | SmartNIC | proc(pid=001) |
| nfi0002 | NF002 | SmartNIC | proc(pid=002) |
| nfi0003 | NF003 | SmartNIC | proc(pid=003) |
| nfi0004 | NF004 | SmartNIC | proc(pid=004) |
| nfi0005 | NF005 | SmartNIC | proc(pid=005) |
| nfi1001 | NF001 | Host | proc(pid=101) |
| nfi1002 | NF002 | Host | proc(pid=102) |
| nfi1003 | NF003 | Host | proc(pid=103) |
| nfi1004 | NF004 | Host | proc(pid=104) |
| nfi1005 | NF005 | Host | proc(pid=105) |

INFORMATION PROCESSING APPARATUS, COMPUTER-READABLE RECORDING MEDIUM STORING OVERLOAD CONTROL PROGRAM, AND OVERLOAD CONTROL METHOD

CROSS-REFERENCE TO RELATED APPLICATION

This application is based upon and claims the benefit of priority of the prior Japanese Patent Application No. 2021-72375, filed on Apr. 22, 2021, the entire contents of which are incorporated herein by reference.

FIELD

The embodiment discussed herein is related to an information processing apparatus, and the like.

BACKGROUND

In recent years, for components of physical servers, storages, and networks, a system that supports a composable infrastructure to make a configuration flexible and facilitates construction or management (hereafter, referred to as a composable system) has been attracting attention. Along with an increase in the amount of communication due to big data processing and an increase in the number of executions of applications that desire high-performance computing capabilities such as machine learning, a situation also occurs in which the computing capabilities of a central processing unit (CPU) alone are insufficient for the processing. An approach for reducing a load by mounting an accelerator such as a smart network interface card (NIC) in a server and causing the server to act for a network function, a storage function, or the like has been attracting attention. Acting for the network function, the storage function, or the like is called "offload".

As an example of the offload, in a system including a main CPU, a smart NIC, a Peripheral Component Interconnect Express (PCIe), there is disclosed a method to reduce a bottleneck of the entire system by offloading some of the application functions to the smart NIC. As another example, a method of reducing a processing load on a main processor by offloading a data processing task to other hardware is disclosed.

Virtualization is shifting from a virtual machine (VM) to a container. Open software for managing and automating virtualization software for the container includes, for example, Kubernetes (registered trademark). Kubernetes is abbreviated as k8s, in some cases.

Based on such a situation, for example, it is conceivable to construct a k8s cluster in a composable system including an accelerator such as a smart NIC. FIG. 19 is a reference diagram illustrating a cluster configuration of a k8s in a composable environment. As illustrated in FIG. 19, a plurality of Pods are activated on one server (k8s worker). An application is executed in each Pod. Examples of the application include middleware or an operation system (OS). An independent environment in which the application may be executed is a container. The k8s manages a plurality of existing containers.

Communication is performed between the servers, between the Pods, and between the Pod and the storage through a cluster communication network (NW). A server (k8s worker) in which the smart NIC is mounted offloads the network function (or the storage function) to the smart NIC.

In an embedded CPU mounted in the smart NIC, a network function (NF1_Appa) for an application a (Appa) and a network function (NF1_Appb) for an application b (Appb) are activated. The NF1_Appa offloads the network function of the application a, and the NF1_Appb offloads the network function of the application b. Therefore, the server may reduce a CPU load on the server.

Examples of the related art include as follows: International Publication Pamphlet No. WO 2020/122024, Japanese National Publication of International Patent Application No. 2016-510524, and U.S. Patent Application Publication No. 2020/0099628.

SUMMARY

According to an aspect of the embodiments, there is provided an information processing apparatus equipped with a network interface card, the network interface card comprising: a network switch; and a first processor configured to perform processing. In an example, the processing includes: recording, for each application, communication information to each application executed in the computer; comparing, in a case where a use rate of the processor is overloaded, a load on each network function that processes communication to each application based on a flow rule of the network switch, based on a record of the communication information; selecting a network function having the smallest load on each network function; and switching an execution position of the selected network function to a network function of the computer to change the flow rule of the network switch.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a data structure of communication record information according to the embodiment;

FIG. 4 illustrates an example of a data structure of communication statistics information according to the embodiment;

FIG. 5 illustrates an example of a data structure of NF load coefficient information according to the embodiment;

FIG. 6 illustrates an example of a data structure of NF instance information according to the embodiment;

FIG. 7 illustrates an example of a data structure of execution NF information according to the embodiment;

FIG. 11 illustrates an example of an operation of communication statistics processing according to the embodiment;

FIGS. 13A and 13B illustrate an example of an operation of the switching target NF determination according to the embodiment;

FIGS. 14A and 14B illustrate an example of an operation of the NF execution position switching according to the embodiment;

DESCRIPTION OF EMBODIMENTS

Meanwhile, in the server in which the smart NIC is mounted, when communication increases, there is a problem that a communication processing amount caused by offloading the network function to the smart NIC exceeds a resource of the CPU (hereafter, also referred to as an embedded CPU) mounted in the smart NIC in some cases.

Figure 20:
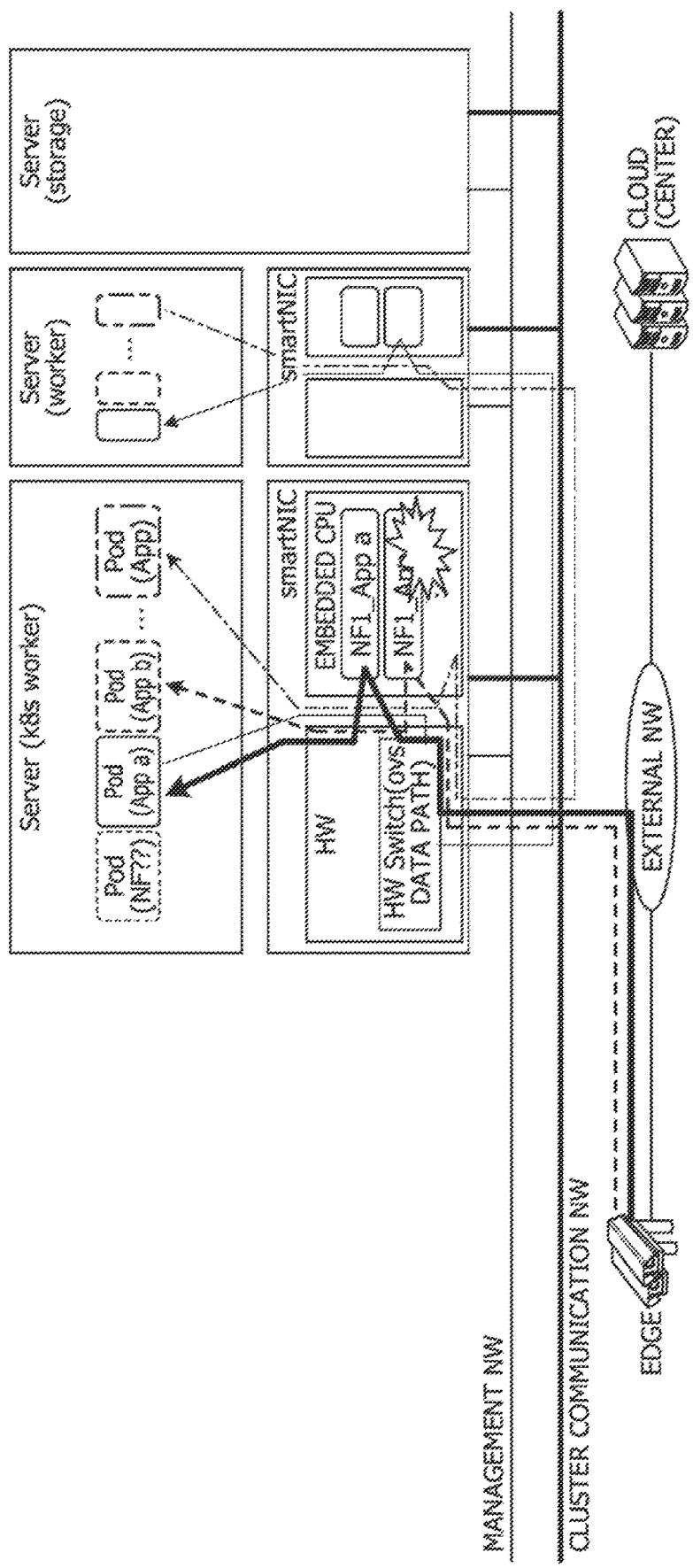
FIG. 20 is a reference diagram describing a problem that a resource of a smart NIC is exceeded.

The problem that the resource (of the embedded CPU) in the smart NIC is exceeded will be described with reference to FIG. 20. FIG. 20 is a reference diagram describing the problem that the resource of the smart NIC is exceeded. An example illustrated in FIG. 20 is a case where a communication processing amount exceeds a resource in the NF1_Appb indicating a network function for the application b (Appb). As a result, a processing delay in the smart NIC increases, and network performance of the server decreases.

It is desirable that the network function offloaded to the smart NIC is shared by the server and the smart NIC. Meanwhile, it is desirable to avoid degradation in performance of the application processing due to execution of the network function by the server. For example, it is desirable to avoid degradation in the processing performance of the applications a and b and the like executed in each Pod by the server executing the network function. Since a communication status changes from hour to hour, it is difficult to statically determine the sharing of the network function. For example, it is difficult to determine which network function is to be executed by the server in accordance with the communication status.

An object of one aspect is to efficiently use, in a server in which a smart NIC is mounted, resources of a CPU in the server and a CPU mounted in the smart NIC even when communication increases.

Hereinafter, embodiments of an information processing apparatus, an overload control program, and an overload control method disclosed in the present application will be described in detail with reference to the drawings. According to the embodiment, a case will be described in which a cluster of Kubernetes (abbreviated as k8s) is constructed, and a container in which an application is executed is deployed.

Embodiment

[Hardware Configuration of Information Processing Apparatus]

Figure 1:
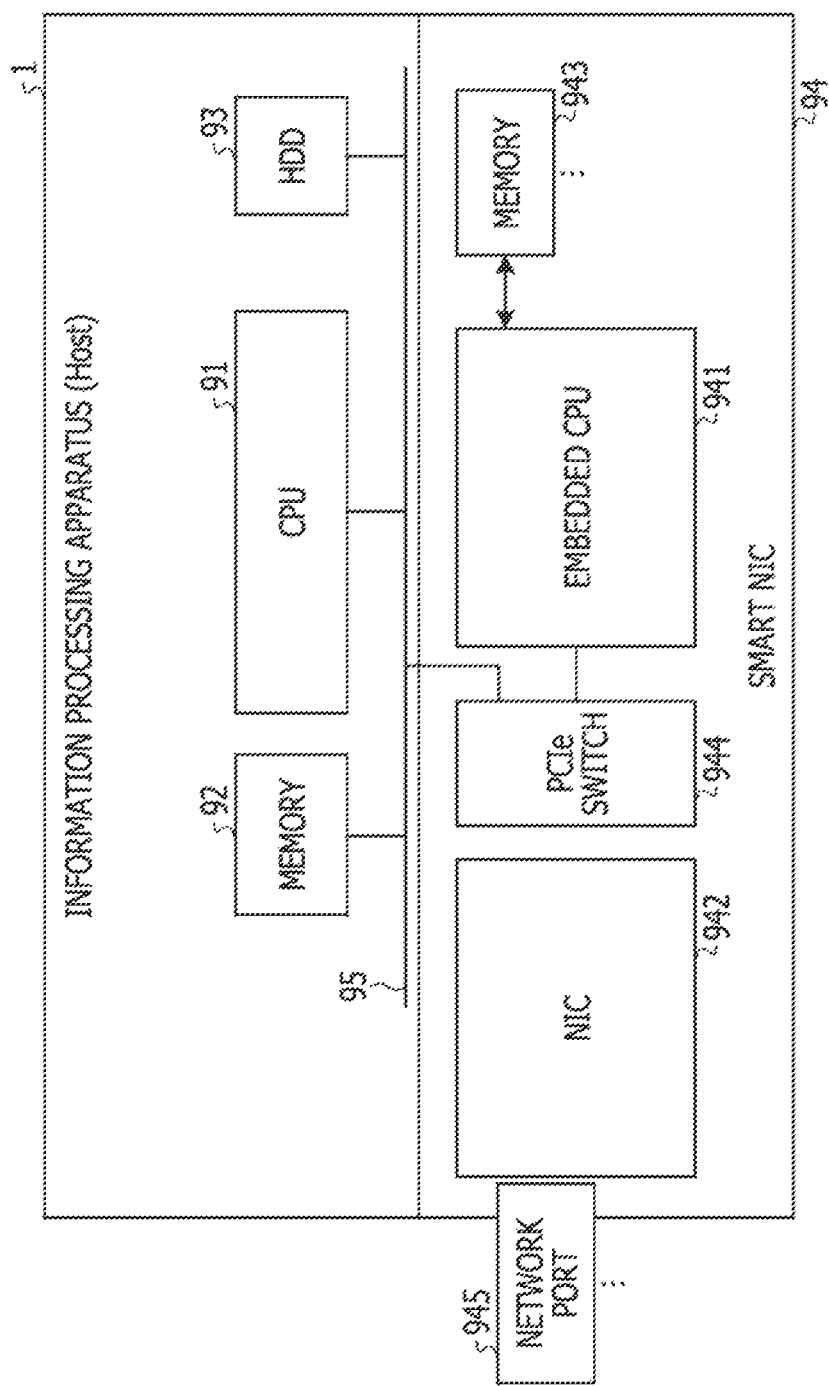
FIG. 1 illustrates an example of a hardware configuration of an information processing apparatus according to an embodiment.

FIG. 1 illustrates an example of a hardware configuration of an information processing apparatus according to an embodiment. As illustrated in FIG. 1, an information processing apparatus 1 includes a central processing unit (CPU) 91, a memory 92, a hard disk drive (HDD) 93, and a smart NIC 94. The smart NIC 94 is an accelerator that is mounted in the information processing apparatus 1, and reduces a load on the CPU 91 by acting for (offloading) a network function. The smart NIC 94 includes an embedded CPU 941, an NIC 942, a memory 943, a PCIe switch 944, and a network port 945. Hereinafter, the information processing apparatus 1 may be referred to as a Host.

The CPU 91, the memory 92, and the HDD 93 are coupled to the PCIe switch 944 by a PCIe bus 95.

Based on a communication flow rule, the PCIe switch 944 transmits communication destined for an application to a network function associated with the application.

The CPU 91 reads a program for causing an operating system (OS) and various virtualized (containerized) applications to operate from the HDD 93 to the memory 92 and the memory 943 to execute the program. The CPU 91 reads a network function used when each of the various applications performs communication from the memory 92, and activates the network function as a process. Even in a case where each network function of each application is not designated by the flow rule, the network function is activated in advance.

In order to reduce a load on the CPU 91, the embedded CPU 941 reads, from the memory 943, a network function used when each of various applications performs communication, and activates the network function as a process. For example, the smart NIC 94 having the embedded CPU 941 offloads the network function responsible for each communication processing of each application.

Meanwhile, in the information processing apparatus 1, when the amount of communication increases due to an increase in Pod, which is a collection of containers, or an increase in communication, or the like, a load on the network function offloaded to the smart NIC 94 may exceed a CPU resource of the smart NIC 94. As a result, a processing delay in the smart NIC 94 increases, and network performance of the information processing apparatus 1 decreases.

In a case where the CPU resource is overloaded, the embedded CPU 941 compares loads on the respective network functions of the respective offloaded applications. For the embedded CPU 941, the network function with the smallest load is handled by the Host, and the flow rule of the PCIe switch 944 is changed. For example, the embedded CPU 941 switches the execution position of the network function for the application with the smallest load from the embedded CPU 941 of the smart NIC 94 to the CPU 91 of the Host. A reason why the network function with the smallest load is set as a switching target is to avoid performance degradation in the Host that is switched to execute the network function. For example, this is for the purpose that the Host executes the application processing, but does not affect this processing.

Hereinafter, the information processing apparatus 1 capable of flexibly using execution of the network functions of both the CPU 91 of the Host and the embedded CPU 941 of the smart NIC 94 depending on a communication status will be described.

[Functional Configuration of Information Processing Apparatus]

Figure 2:
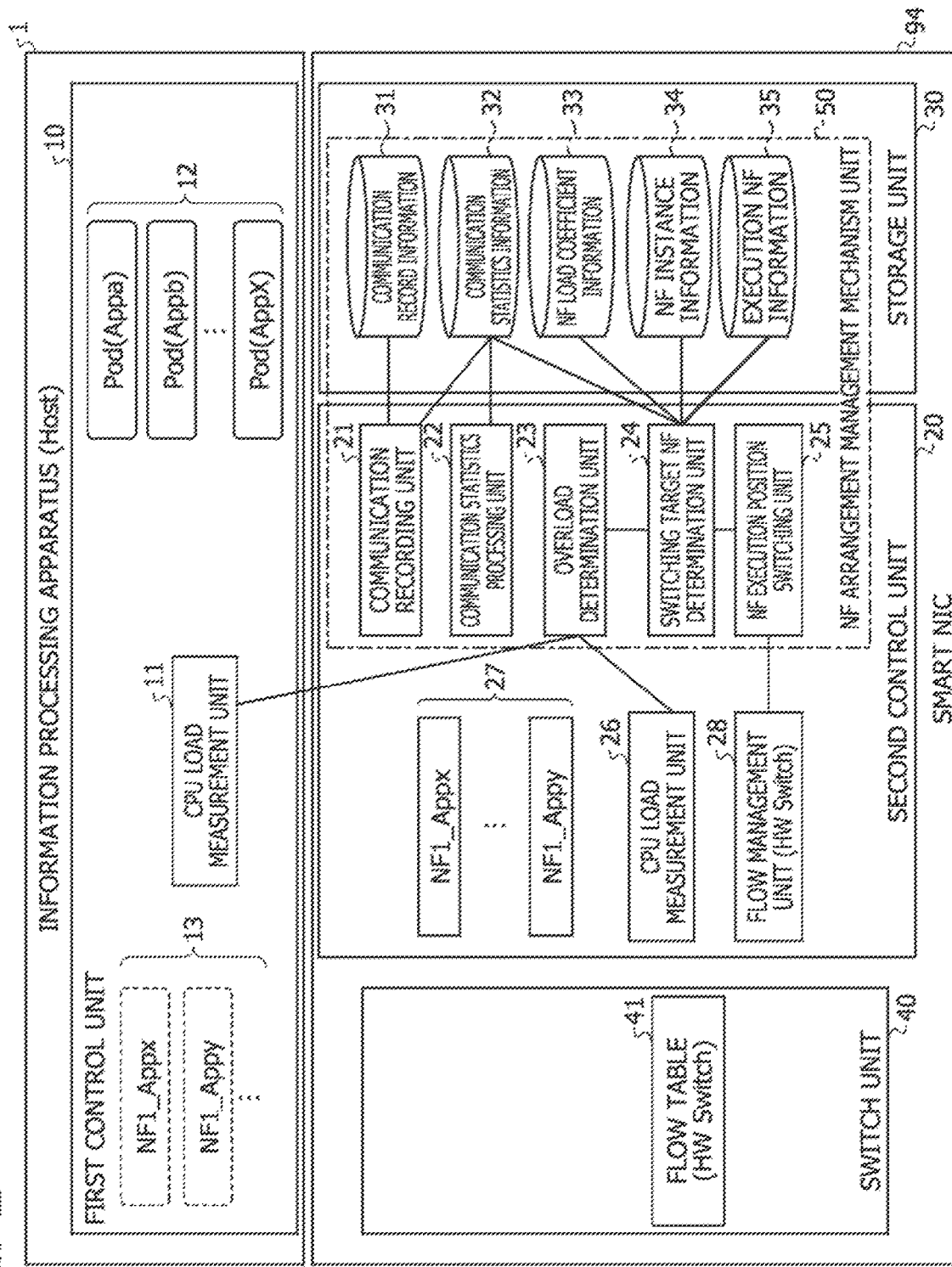
FIG. 2 is a block diagram illustrating an example of a functional configuration of the information processing apparatus according to the embodiment.

FIG. 2 is a block diagram illustrating an example of a functional configuration of the information processing apparatus according to the embodiment. As illustrated in FIG. 2, the information processing apparatus 1 includes a first control unit 10, a second control unit 20, a storage unit 30, and a switch unit 40. The first control unit 10 corresponds to the CPU 91 illustrated in FIG. 1. The second control unit 20 corresponds to the embedded CPU 941 illustrated in FIG. 1. The storage unit 30 corresponds to the memory 943 illustrated in FIG. 1. The switch unit 40 corresponds to the NIC 942 and PCIe switch 944 illustrated in FIG. 1.

The first control unit 10 includes a CPU load measurement unit 11, a Pod 12 that executes each application, and a network function (NF) 13 of each application. The CPU load measurement unit 11 measures a load on the CPU 91 of the Host. The NF 13 of each application is responsible for a network function of communication for each application. The applications executed in the respective Pods 12 vary, and have different packet size trends and communication characteristics. For example, the application includes an application that performs continuous communication such as streaming, an application that performs a large amount of communication from time to time such as an artificial intelligence (AI) which acquires learning data, and an application that performs a small amount of periodical communication used in management of a k8s master.

The second control unit 20 includes a communication recording unit 21, a communication statistics processing unit 22, an overload determination unit 23, a switching target NF determination unit 24, and an NF execution position switching unit 25. The second control unit 20 includes a CPU load measurement unit 26, a network function (NF) 27 of each application, and a flow management unit 28. The storage unit 30 includes communication record information 31, communication statistics information 32, NF load coefficient information 33, NF instance information 34, and execution NF information 35. The switch unit 40 includes a flow table 41 that stores flow rules. As an NF arrangement management mechanism that performs overload control, the communication recording unit 21, the communication statistics processing unit 22, the overload determination unit 23, the switching target NF determination unit 24, the NF execution position switching unit 25, the communication record information 31, the communication statistics information 32, the NF load coefficient information 33, the NF instance information 34, and the execution NF information 35 are, for example, referred to as an NF arrangement management mechanism unit 50. The communication recording unit 21 is an example of a recording unit. The overload determination unit 23 and the switching target NF determination unit 24 are examples of a comparison unit and a selection unit. The NF execution position switching unit 25 is an example of a switching unit.

The communication record information 31 is information in which information on all packets in the Host is recorded for each application. The communication record information 31 is generated by the communication recording unit 21, which will be described below. A data structure of the communication record information 31 will be described with reference to FIG. 3.

FIG. 3 illustrates an example of a data structure of communication record information according to the embodiment. As illustrated in FIG. 3, the communication record information 31 stores a communication time, a transmission source IP, a destination IP, and a packet size in association with each other. The transmission source IP indicates an IP address of a transmission source. The destination IP indicates an IP address of the Pod 12 at which a target application is executed.

Returning to FIG. 2, the communication statistics information 32 stores information obtained by performing statistics processing on the communication record information 31 for each application. The communication statistics information 32 is generated by the communication statistics processing unit 22, which will be described below. A data structure of the communication statistics information 32 will be described with reference to FIG. 4.

FIG. 4 illustrates an example of a data structure of communication statistics information according to the embodiment. As illustrated in FIG. 4, the communication statistics information 32 stores a target App, a communication record for each continuation period, and a distribution by packet size in association with each other. The target App indicates a target application, and indicates an IP address of the Pod 12 at which the target application is executed. The communication record in the continuation period means a communication record in a period in which communication of packets of the target application continues, and includes a start time, an end time, and the number of packets. The continuous communication means communication in which a packet interval is equal to or less than a certain period, for example, communication without an interval of 5 seconds or more. The number of packets indicates the number of packets communicated during the continuation period. The distribution by packet size indicates a distribution of sizes of packets communicated during the continuation period. A width of a class in the distribution of the sizes of packets is, for example, 300 bytes, and is not limited to this. Meanwhile, when the class width is changed, the communication statistics processing unit 22 recalculates the distribution by packet size for all target applications. As illustrated in FIG. 4, "1-300", "301-600", and "601-900" are applied as the classes of the distribution by packet size. The distribution may be a ratio (%) or a frequency (the number of packets) of the number of packets of the communication record in the continuation period. The ratio (%) is set in FIG. 4.

Returning to FIG. 2, the NF load coefficient information 33 is information indicating a load coefficient of the NF. The load coefficient of the NF is a relative value used for comparing loads on the respective NFs, and is distinguished by a type of the NF or a packet size. For example, the type of the NF includes deep packet inspection (DPI) or load balancing (LB). Since a data portion of a packet is inspected in the DPI, a CPU load is higher than in the LB. A larger packet size causes a higher CPU load than a smaller packet size. For this reason, an NF load coefficient is defined such that a value of the NF load coefficient is distinguished depending on the type of the NF or the packet size. The NF load coefficient information 33 is defined in advance. For example, a calculation method of the NF load coefficient may include a calculation based on a measurement result of the CPU load by performing each communication processing while changing the packet size, in an identical environment in which the smart NIC 94 is mounted. The NF load coefficient information 33 is used when the loads on the respective NFs are compared with each other by the switching target NF determination unit 24, which will be described below. An example of a data structure of the NF load coefficient information 33 will be described with reference to FIG. 5.

FIG. 5 illustrates an example of a data structure of NF load coefficient information according to the embodiment. As illustrated in FIG. 5, the NF load coefficient information 33 defines the load coefficient of the NF in association with an NF type and a packet size. For example, in a case where the packet size is "1-300" and the NF type is "DPI", the NF load coefficient is defined as "2.0". In a case where the NF type is "LB", the NF load coefficient is defined as "2.0". In a case where the packet size is "301-600", the NF load coefficient is defined as "2.5" when the NF type is "DPI". In a case where the NF type is "LB", the NF load coefficient is defined as "2.0". In a case where the packet size is "601-900", the NF load coefficient is defined as "4.5" when the NF type is "DPI". In a case where the NF type is "LB", the NF load coefficient is defined as "2.0". In this manner, the NF load coefficient is defined such that, when the packet size is large, the NF load coefficient has a larger value than a smaller value as the packet size, and even when the packet size is the same, the type of the NF "DPI" has a larger value than "LB".

Returning to FIG. 2, the NF instance information 34 is information in which information on processes (NF instances) of all the activated NFs is listed. The execution NF information 35 is information on the NF currently used by the Pod 12 which executes each target application. Examples of data structures of the NF instance information 34 and the execution NF information 35 will be respectively described with reference to FIGS. 6 and 7.

FIG. 6 illustrates an example of a data structure of NF instance information according to the embodiment. As illustrated in FIG. 6, the NF instance information 34 stores an instance ID (identifier), a target function ID, an execution location, and activation information in association with each other. The instance ID is an identifier for uniquely identifying a process of an NF (NF instance). The target function ID is an identifier for identifying a target NF for each application (Pod). The execution location indicates an execution location of the NF. "SmartNIC" indicating the smart NIC 94 or "Host" indicating a Host is set as the execution location. The activation information indicates a process id assigned at a time of activation. As an example, in a case where a target device ID is "NF001", two processes of a process (instance ID: "nfi0001") activated in the smart NIC 94 and a process (instance ID: "nfi1001") activated in the Host are activated.

FIG. 7 illustrates an example of a data structure of execution NF information according to the embodiment. As illustrated in FIG. 7, the execution NF information 35 stores a function ID, a target App (IP address), a function type, and an execution instance ID in association with each other. The function ID is an identifier for identifying a target NF currently being used for each application (Pod). The target App (IP address) indicates an IP address of the Pod 12 at which the target application is executed. The function type indicates a type of an NF indicated by the function ID. For example, the function type includes DPI or LB. The execution instance ID is an identifier for uniquely identifying a process (NF instance) of a target NF currently being used. By collating this execution instance ID with the instance ID of the NF instance information 34, it is possible to know the NF with the execution location at which the target application is executed. All the NFs of the target applications respectively executed in Poda, Podb, and Podc are executed in the smart NIC 94.

Returning to FIG. 2, the communication recording unit 21 records information on all packets transmitted and received by the smart NIC 94 in the communication record information 31. For example, the communication recording unit 21 may acquire information from the PCIe switch 944 and record the information, or may collect packets passing through the network port 945 by mirroring and analyzing a header to acquire and record the information.

Based on the communication record information 31, the communication statistics processing unit 22 calculates statistics information on communication for each application, and generates the communication statistics information 32. For example, the communication statistics processing unit 22 classifies packet information for each application from the communication record information 31. For each application, the communication statistics processing unit 22 refers to a communication time to acquire information on packets that are continuously communicated. For the information on packets that continue to be communicated continuously, the communication statistics processing unit 22 calculates a start time, an end time, and the number of packets for a continuation period, and a distribution by packet size. The continuous communication means communication in which a packet interval is equal to or less than a certain period. The communication statistics processing unit 22 records the target application, the start time, the end time, and the number of packets for the continuation period, and the distribution by packet size as one record in the communication statistics information 32 in association with each other.

The overload determination unit 23 determines an overload on the embedded CPU 941 of the smart NIC 94. For example, the overload determination unit 23 measures a load on each of the CPU 91 of the Host and the embedded CPU 941 of the smart NIC 94. The load on the CPU 91 of the Host is measured by the CPU load measurement unit 11. The load on the embedded CPU 941 of the smart NIC 94 is measured by the CPU load measurement unit 26, which will be described below. In a case where the load on the CPU 91 of the Host is smaller than a first threshold value and the load on the embedded CPU 941 of the smart NIC 94 is larger than a second threshold value, the overload determination unit 23 determines that the embedded CPU 941 of the smart NIC 94 is overloaded. As a result, the overload determination unit 23 determines that switching of the execution position of the network function (NF) is to be performed. In a case where the load on the CPU 91 of the Host is larger than the first threshold value, the overload determination unit 23 does not determine that the switching of the execution position of the NF is to be performed even in a case where the load on the embedded CPU 941 of the smart NIC 94 is larger than the second threshold value. For example, in a case where the load on the CPU 91 of the Host is large, switching of the NF to the Host is not executed. This is because the CPU 91 of the Host is used in processing of the application and is not in a state in which the CPU resource is usable for processing of the NF.

The switching target NF determination unit 24 determines an NF as a switching target in a case where a use rate of the embedded CPU 941 of the smart NIC 94 is overloaded.

For example, the switching target NF determination unit 24 compares loads on the respective NFs based on the type of the network function (NF), and the number of packets, the size of the packet, and the communication time obtained from the communication statistics information 32. This is because a magnitude of the load on each NF for each application is assumed to be determined by, for example, the number of packets, the type of the NF, the packet size, and the communication time. For example, an application having a large number of packets has a larger processing load even with the same NF. The processing load for one packet varies depending on the type of the NF (for example, DPI or LB). The NF for application having the short communication time uses CPU resources for a short time. Therefore, the switching target NF determination unit 24 calculates and compares NF load comparison values of the respective NFs based on the type of the NF, the number of packets, the packet size, and the communication time.

As an example, the switching target NF determination unit 24 calculates the NF load comparison value of the NF used by each application based on communication contents for the latest 5 minutes. By using the following Equation (1) and Equation (2), the switching target NF determination unit 24 calculates the NF load comparison value of each NF.

NF Load Comparison Value of Each NF=Σ Load Comparison Value in Each Continuous Communication    (1)

Load Comparison Value in One Continuous Communication=Σ(Number of Packets by Packet Size×NF Load Coefficient)×Continuous Communication Time    (2)

For example, the switching target NF determination unit 24 refers to the communication statistics information 32, and multiplies the number of packets by packet size obtained from the distribution by packet size by an NF load coefficient corresponding to the packet size and the type of the NF, for each continuous communication time within the latest 5 minutes. The switching target NF determination unit 24 performs the multiplication process for each packet size, and adds a value by packet size. The switching target NF determination unit 24 multiplies the added value by the communication continuation time. The NF load coefficient is obtained from the NF load coefficient information 33. A value obtained by the multiplication is a load comparison value in one continuous communication for the NF (see Equation (2)). The switching target NF determination unit 24 adds the load comparison values in the respective continuous communications to calculate the NF load comparison value of the corresponding NF (see Equation (1)).

The switching target NF determination unit 24 compares the NF load comparison values of the respective NFs, and determines an NF having the smallest load on each NF as the switching target NF. A reason why the NF having the smallest load is set as the switching target NF is to avoid performance degradation in the Host that executes the switched NF. For example, this is for the purpose that the Host executes the application processing, but does not affect this processing.

For the flow rule in the flow table 41, the NF execution position switching unit 25 switches an execution position of the determined NF to the NF of the Host. For example, the NF execution position switching unit 25 acquires execution instance information (before switching) of the NF determined as the switching target, from the execution NF information 35. The NF execution position switching unit 25 acquires instance information after the switching of the NF determined as the switching target, from the NF instance information 34. The NF execution position switching unit 25 updates the execution instance information before the switching to the instance information after the switching in the flow table 41.

The CPU load measurement unit 26 measures a load on the embedded CPU 941 included in the smart NIC 94. The NF 27 of each application is responsible for a network function of communication for each application. The flow management unit 28 manages a flow rule of the PCIe switch 944.

[Image of Switching Target NF Determination]

Figure 8:
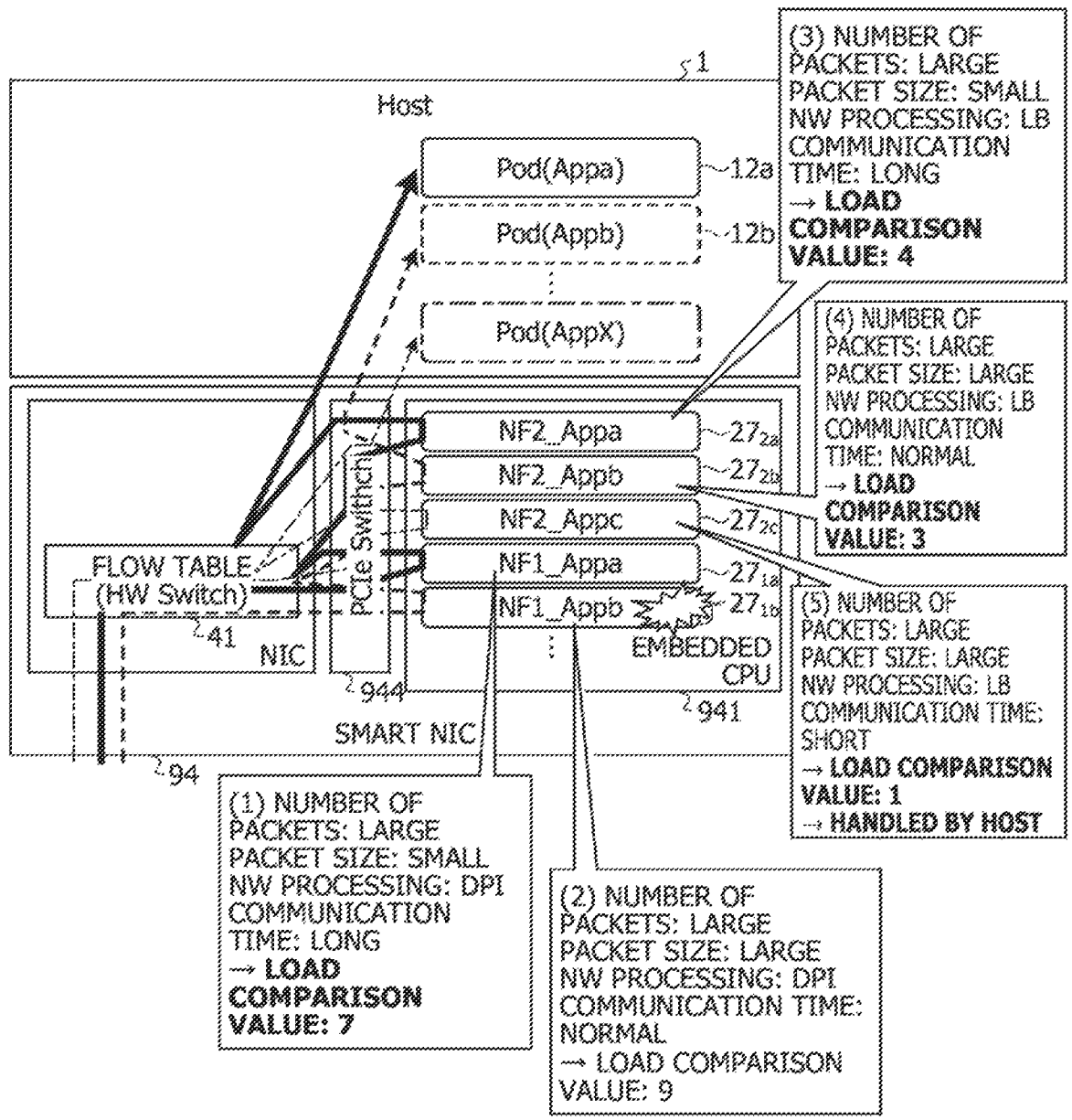
FIG. 8 is a diagram describing an image of a switching target NF determination according to the embodiment.

An image of determining a switching target NF according to the embodiment will be described with reference to FIG. 8. FIG. 8 is a diagram describing an image of a switching target NF determination according to the embodiment. As illustrated in FIG. 8, in the embedded CPU 941 of the smart NIC 94, network functions (NFs) $27_{2a}$ and $27_{1a}$ of an application a, NFs $27_{2b}$ and $27_{1b}$ of an application b, and an NF $27_{2c}$ of an application c are executed. For example, based on a flow rule of the flow table 41 in the PCIe switch 944, communication destined for the application a is performed to the Pod $12_a$ at which the application a is executed through the NFs $27_{1a}$ and $27_{2a}$ of the application a. Based on the flow rule of the flow table 41 in the PCIe switch 944, communication destined for the application b is performed to the Pod $12_b$ at which the application b is executed through the NFs $27_{1b}$ and $27_{2b}$ of the application b.

Under such a situation, in a case where a CPU use rate of the embedded CPU 941 is overloaded and a CPU use rate of the CPU 91 is not overloaded, the switching target NF determination unit 24 performs the following processing. The switching target NF determination unit 24 calculates a load on each NF as an NF load comparison value based on a type of the NF (a type of network processing), and the number of packets, a size of a packet, and a communication time obtained from the communication statistics information 32. The switching target NF determination unit 24 compares the NF load comparison values of the respective NFs. As the type of the NF, a function type corresponding to a function ID in the execution NF information 35 may be referred to. The number of packets may be calculated from the number of packets and the distribution by packet size in the communication statistics information 32. The packet size may be calculated from the distribution by packet size in the communication statistics information 32. The communication time may be calculated from the start time and the end time of the communication statistics information 32.

For convenience of explanation, it is assumed that the number of packets is represented by "large", "normal", and "small". The packet size is represented by "large", "normal", and "small". The communication time is represented by "long", "normal", and "short". For the NF $27_{1a}$ of the application a, it is assumed that the number of packets is "large", the packet size is "small", the type of network (NW) processing is "DPI", the communication time is "long", and the NF load comparison value is calculated to be "7". For the NF $27_{1b}$ of the application b, the number of packets is "large", the packet size is "large", the type of NW processing is "DPI", the communication time is "normal", and the NF load comparison value is calculated as "9". For the NF $27_{2a}$ of the application a, the number of packets is "large", the packet size is "small", the type of NW processing is "LB", the communication time is "long", and the NF load comparison value is calculated as "4". For the NF $27_{2b}$ of the application b, the number of packets is "large", the packet size is "large", the type of NW processing is "LB", the communication time is "normal", and the NF load comparison value is calculated as "3". For the NF $27_{2c}$ of the application c, the number of packets is "large", the packet size is "large", the type of NW processing is "LB", the communication time is "short", and the NF load comparison value is calculated to be "1".

The switching target NF determination unit 24 compares the NF load comparison values of the respective NFs, and determines an NF having the smallest load on each NF as the switching target NF. The switching target NF determination unit 24 compares the NF load comparison values of the respective NFs, and determines the NF $27_{2c}$ of the application c having the smallest NF load comparison value as the switching target NF. For example, the switching target NF determination unit 24 causes the Host to handle the network function handled by the NF $27_{2c}$ of the application c.

[Image of NF Execution Position Switching]

Figure 9:
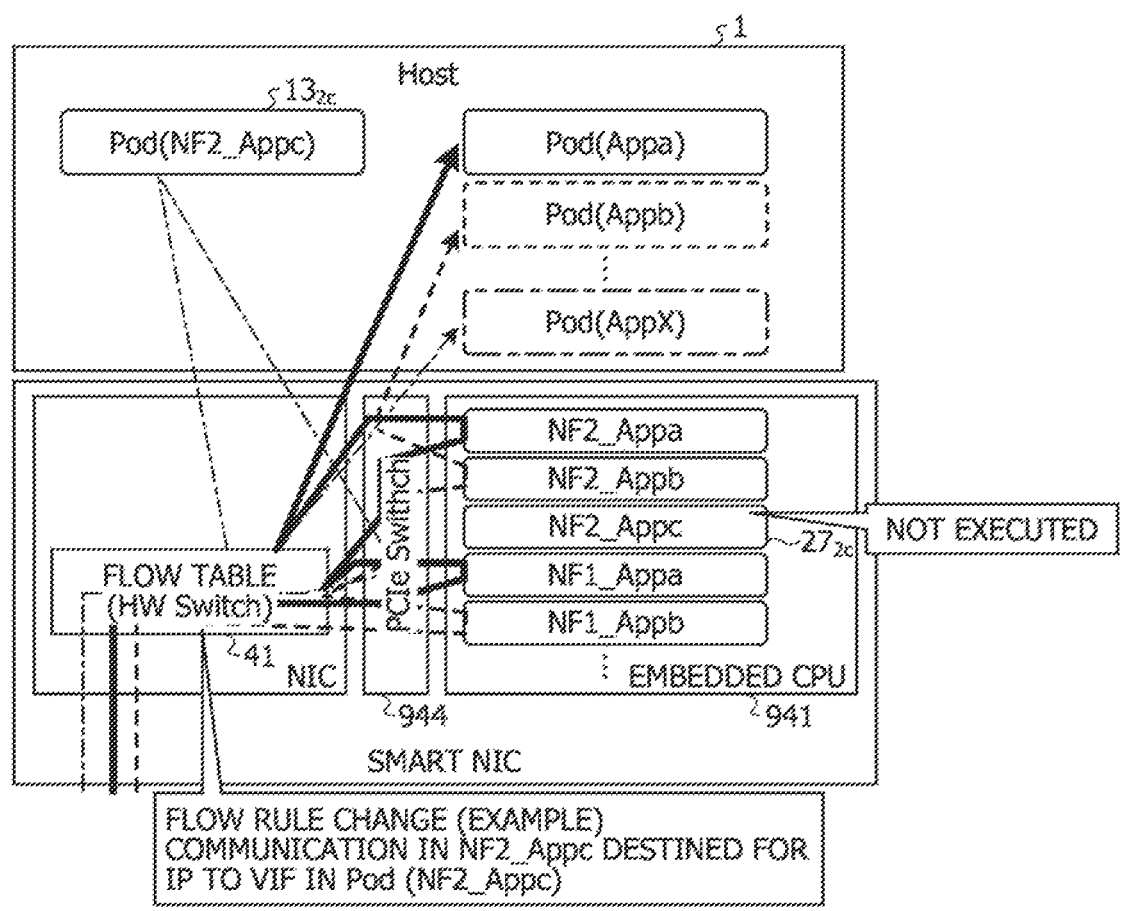
FIG. 9 is a diagram describing an image of NF execution position switching according to the embodiment.

Subsequently, an image of NF execution position switching according to the embodiment will be described with reference to FIG. 9. FIG. 9 is a diagram describing the image of the NF execution position switching according to the embodiment. As illustrated in FIG. 8, it is assumed that the NF $27_{2c}$ of the application c is determined as the switching target NF.

For a flow rule in the flow table 41, the NF execution position switching unit 25 switches an execution position of the NF from the NF determined as the switching target to the NF of the Host. The NF execution position switching unit 25 switches the flow rule of the NF execution location of the application c from the NF $27_{2c}$ to an NF $13_{2c}$. Therefore, based on the flow rule of the flow table 41, communication destined for the application c is performed to the Pod at which the application c is executed through the NF $13_{2c}$ of the application c at the Host.

Example of Operation of Overload Control

Figure 10:
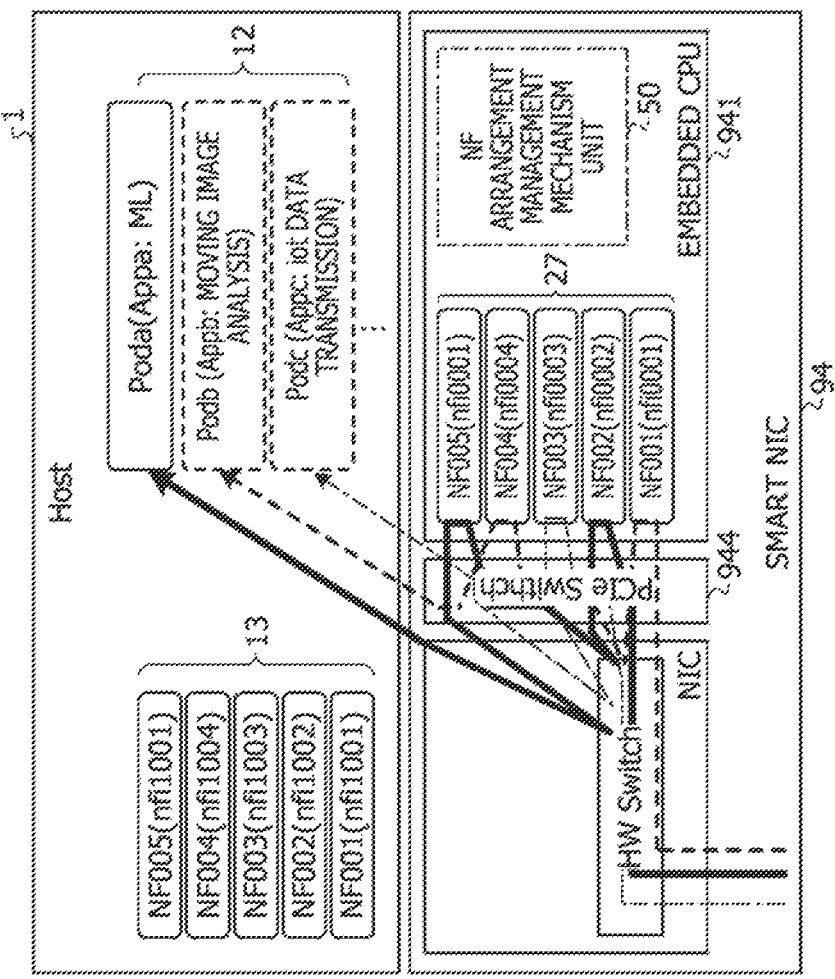
FIG. 10 illustrates a premise for explaining an example of an operation of overload control according to the embodiment.

FIGS. 10 to 14 are diagrams describing an example of an operation of overload control according to the embodiment. FIG. 10 illustrates a premise for explaining the example of the operation of the overload control according to the embodiment. As illustrated in FIG. 10, a plurality of Pods at which applications are executed are deployed in the Host. The application a is an application targeted for machine learning (ML), and is executed by Poda. The application b is an application targeted for moving image analysis, and is executed by Podb. The application c is an application targeted for iot data transmission, and is executed by Podc.

At the embedded CPU 941, the NF arrangement management mechanism unit 50 manages the NF instance information 34 indicating instance information on the arranged NF and the execution NF information 35 indicating instance information on the NF being executed. For example, for an instance related to DPI (function ID: "NF001") in Podb, the following two processes are activated. The two processes are a process (instance ID: "nfi0001") activated in the smart NIC 94 and a process (instance ID: "nfi1001") activated in the Host. For an instance related to LB (function ID: "NF004") in Podb, the following two processes are activated. The two processes are a process (instance ID: "nfi0004") activated in the smart NIC 94 and a process (instance ID: "nfi1004") activated in the Host.

An instance ID of an NF which is currently used by Podb and of which the function type indicates DPI is "nfi0001" in the smart NIC 94. An instance ID of an NF which is currently used by Poda and of which the function type indicates DPI is "nfi0002" in the smart NIC 94. An instance ID of an NF which is currently used by Podc and of which the function type indicates LB is "nfi0003" in the smart NIC 94. An instance ID of an NF which is currently used by Podb and of which the function type indicates LB is "nfi0004" in the smart NIC 94. An instance ID of an NF which is currently used by Poda and of which the function type indicates LB is "nfi0005" in the smart NIC 94.

FIG. 11 illustrates an example of an operation of communication statistics processing according to the embodiment. As illustrated in FIG. 11, the communication recording unit 21 records information on all input and output packets transmitted and received by the smart NIC 94 in the communication record information 31.

Based on the communication record information 31, the communication statistics processing unit 22 calculates statistics information on communication for each application. For example, the communication statistics processing unit 22 classifies packet information for each destination IP of a target application, from the communication record information 31. For each destination IP of the target application, the communication statistics processing unit 22 refers to a communication time, and collects the packet information that is continuously being communicated. The continuous communication means communication in which a packet interval is equal to or less than 5 seconds, for example. For example, when the packet interval is equal to or less than 5 seconds, it is determined that the communication continues, and when the packet interval exceeds 5 seconds, the communication is interrupted.

For the information on packets that continue to be communicated continuously, the communication statistics processing unit 22 calculates a start time, an end time, and the number of packets for a continuation period, and a distribution by packet size. The distribution may be a ratio or a frequency (the number of packets). The communication statistics processing unit 22 records the target application, the start time, the end time, and the number of packets for the continuation period, and the distribution by packet size as one record in the communication statistics information 32 in association with each other. For example, in a first communication record for each continuation period in which Appa executed in Poda is set as a destination IP, "20:00: 00.001" is recorded as the start time, "20:00:30.001" is recorded as the end time, and "5000" is recorded as the number of packets. For this communication record, a packet size of "301-600" is recorded as "10"%, a packet sizes of each of "601-900" and "901-1200" is recorded as "15"%, and a packet size of "1201-1500" is recorded as "60"%. In a second communication record for each continuation period, "20:04:20.055" is recorded as the start time, "20:04: 50.055" is recorded as the end time, and "5100" is recorded as the number of packets. For this communication record, the packet size of "301-600" is recorded as "0"%, the packet size of each of "601-900" and "901-1200" is recorded as "10"%, and the packet size of "1201-1500" is recorded as "80"%.

Figure 12:
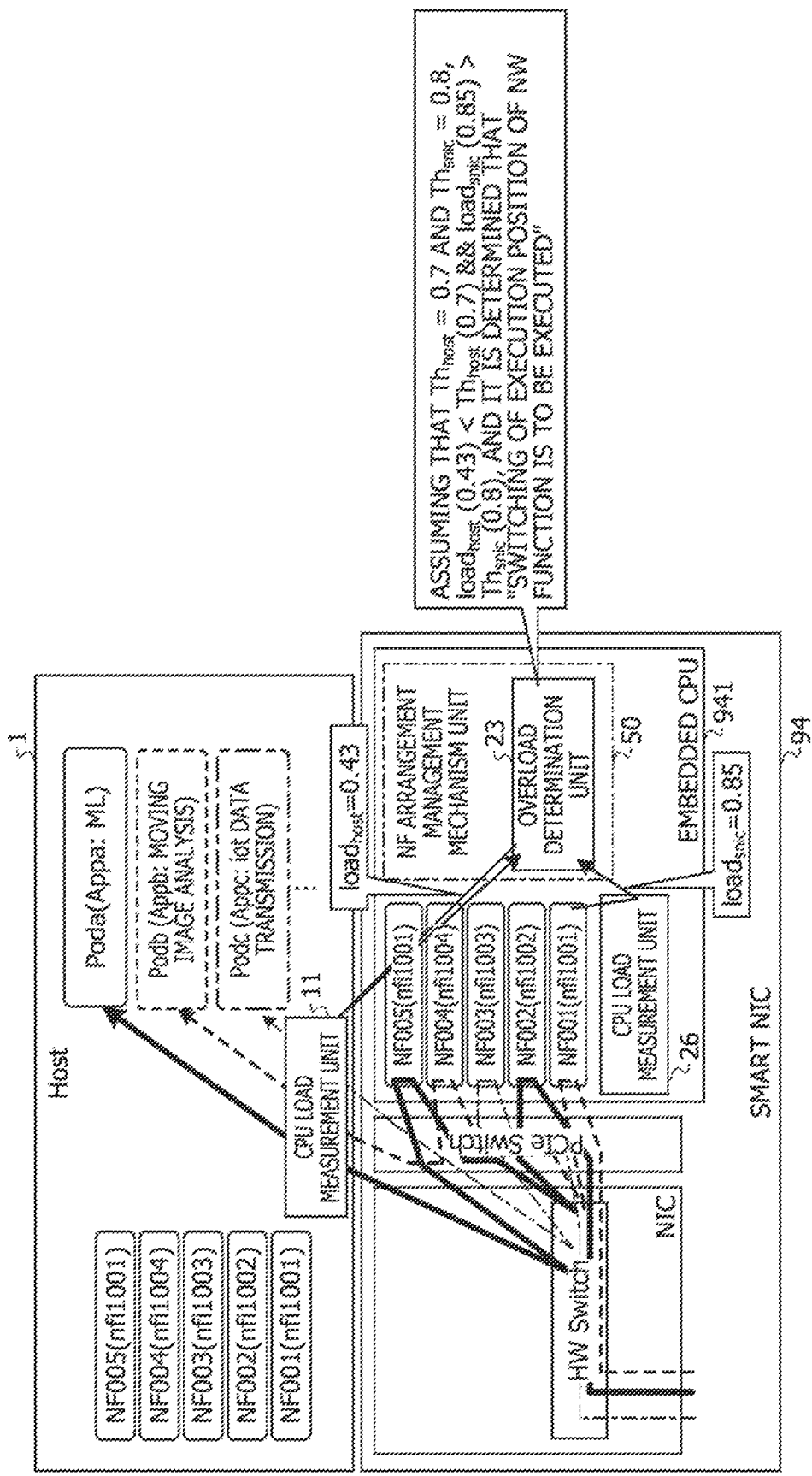
FIG. 12 illustrates an example of an operation of an overload determination according to the embodiment.

FIG. 12 illustrates an example of an operation of an overload determination according to the embodiment. As illustrated in FIG. 12, the overload determination unit 23 measures a load on each of the CPU 91 of the Host and the embedded CPU 941 of the smart NIC 94. The load on the CPU 91 of the Host is measured by the CPU load measurement unit 11. The load on the embedded CPU 941 of the smart NIC 94 is measured by the CPU load measurement unit 26.

In a case where the load on the CPU 91 of the Host is smaller than $Th_{host}$ and the load on the embedded CPU 941 of the smart NIC 94 is larger than $Th_{snic}$, the overload determination unit 23 determines that the embedded CPU 941 of the smart NIC 94 is overloaded. The overload determination unit 23 determines that switching of an execution position of the network function (NF) is to be performed. $Th_{host}$ is a threshold value of the load on the CPU 91 of the Host, and is an example of the first threshold value. $Th_{snic}$ is a threshold value of the load on the embedded CPU 941, and is an example of the second threshold value. It is assumed that $Th_{host}$ is 0.7 and $Th_{snic}$ is 0.8. It is assumed that a load $load_{host}$ of the CPU 91 of Host is 0.43, and a load $load_{snic}$ of the embedded CPU 941 is 0.85. Since $load_{host}$ (0.43) is smaller than $Th_{host}$ (0.7) and $load_{snic}$ (0.85) is larger than $Th_{snic}$ (0.8), the overload determination unit 23 determines that the embedded CPU 941 is overloaded. The overload determination unit 23 determines that switching of the execution position of the NF is to be performed.

FIG. 13 (i.e., FIGS. 13A and 13B) illustrates an example of an operation of a switching target NF determination according to the embodiment. As illustrated in FIG. 13, the switching target NF determination unit 24 compares a load on each NF based on an NF type, and the number of packets, a size of a packet, and a communication time obtained from the communication statistics information 32. As an example, the switching target NF determination unit 24 calculates an NF load comparison value of the NF used by each target App based on communication contents for the latest 5 minutes. The NF load comparison value of each NF is calculated by using Equation (1) and Equation (2).

It is assumed that the switching target NF determination unit 24 performs calculation based on the communication contents for the latest 5 minutes of the 20:00:00 to 20:05:00.

The NF load comparison value when a function ID of the NF is "NF002" (target App: ML executed in Poda, function type: DPI, and continuation period: 2 times) is calculated as "26,080.0" as follows. First, a load comparison value in a first continuous communication time "20:00:00.001 to 20:00:30.001" is obtained by adding the respective load comparison values of "301-600", "601-900", "901-1200", and "1201-1500" as packet sizes. Since the number of packets is "5000×0.1" and an NF load coefficient of DPI is "2.5", the load comparison value of the packet size "301-600" is calculated as "(5000×0.1)×2.5". Since the number of packets is "5000×0.15" and the NF load coefficient of DPI is "4.5", the load comparison value of the packet size "601-900" is calculated as "(5000×0.15)×4.5". Since the number of packets is "5000×0.15" and the NF load coefficient of DPI is "5.0", the load comparison value of the packet size "901-1200" is calculated as "(5000×0.15)×5.0". Since the number of packets is "5000×0.6" and the NF load coefficient of DPI is "5.5", the load comparison value of the packet size "1201-1500" is calculated as "(5000×0.6)×5.5". The load comparison value in the first continuous communication time is "12,437.5" by adding the respective load comparison values of the packet sizes and multiplying the added value by the communication continuation time "0.5" (see Equation (2)).

A load comparison value in a second continuous communication time "20:04:15.001 to 20:02:45.001" is obtained by adding the respective load comparison values of "601-900", "901-1200", and "1201-1500" as packet sizes. Since the number of packets is "5100×0.1" and the NF load coefficient of DPI is "4.5", the load comparison value of the packet size "601-900" is calculated as "(5100×0.1)×4.5". Since the number of packets is "5100×0.1" and the NF load coefficient of DPI is "5.0", the load comparison value of the packet size "901-1200" is calculated as "(5100×0.1)×5.0". Since the number of packets is "5100×0.8" and the NF load coefficient of DPI is "5.5", the load comparison value of the packet size "1201-1500" is calculated as "(5100×0.8)×5.5". The load comparison value in the second continuous communication time is "13,642.5" by adding the respective load comparison values of the packet sizes and multiplying the added value by the communication continuation time "0.5" (see Equation (2)).

A sum "26,080.0" of the load comparison value in the first continuous communication time and the load comparison value in the second continuous communication time is an NF load comparison value of "NF002" (see Equation (1)).

In the same manner, an NF load comparison value of "NF001" is calculated as "23,400.0". An NF load comparison value of "NF003" is calculated as "1,475.0". An NF load comparison value of "NF004" is calculated as "18,000.0". An NF load comparison value of "NF005" is calculated as "10,100.0".

The switching target NF determination unit 24 compares the NF load comparison values of the respective NFs, and determines an NF having the smallest load on each NF as the switching target NF. Since the NF having the smallest NF load comparison value is "NF003", the switching target NF determination unit 24 determines the NF of "NF003" as a switching target NF.

Figure 14A:
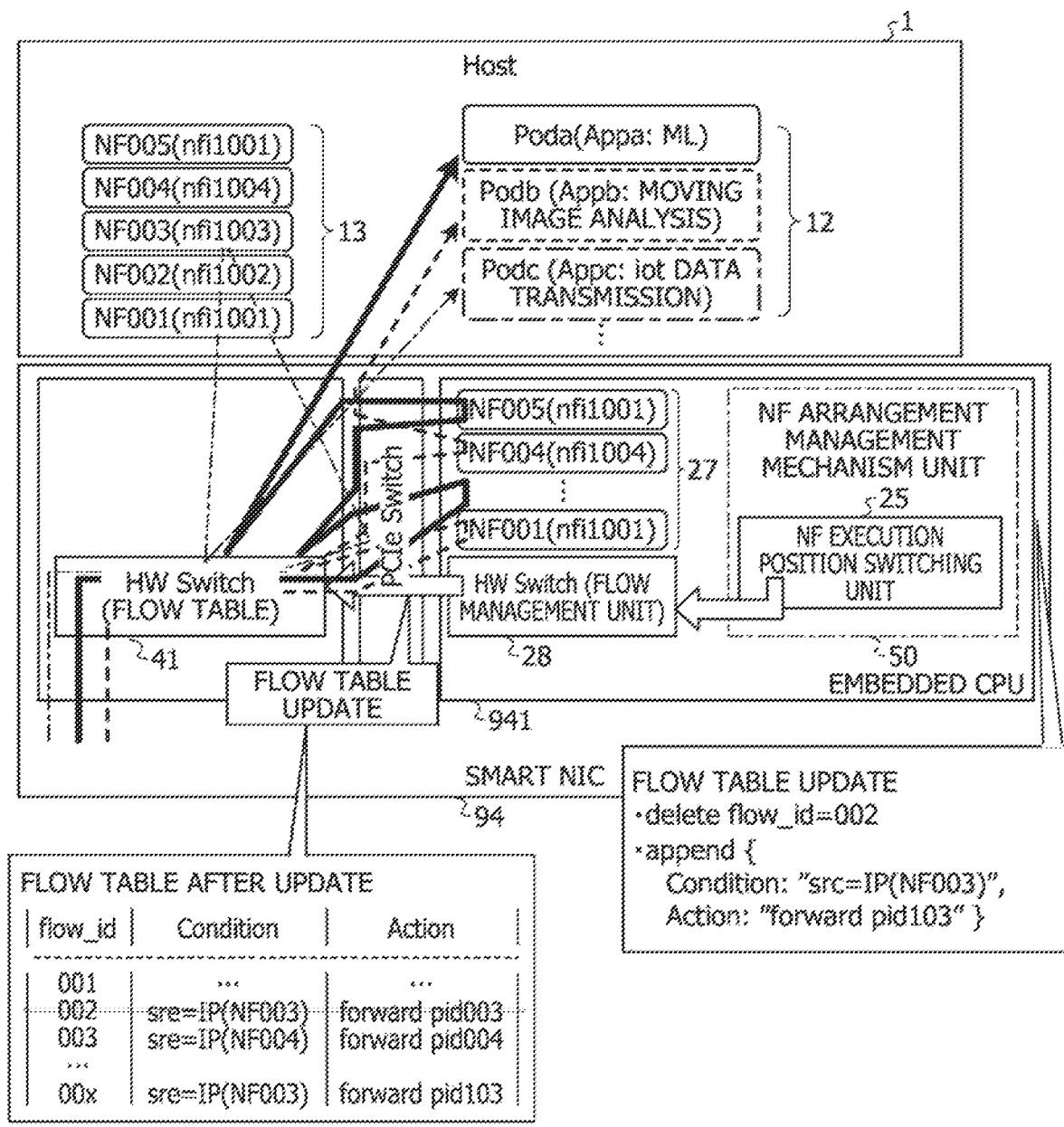

FIG. 14 (i.e., FIGS. 14A and 14B) illustrates an example of an operation of NF execution position switching according to the embodiment. As illustrated in FIG. 14, the NF execution position switching unit 25 acquires instance information before and after switching for the NF of the "NF003" as a switching target. The NF execution position switching unit 25 acquires the execution instance ID "nfi0003" corresponding to the function ID "NF003" from the execution NF information 35 as the instance ID before the switching. As the instance IDs corresponding to the target function ID "NF003", the NF execution position switching unit 25 acquires "nfi0003" and "nfi1003" from the NF instance information 34. The NF execution position switching unit 25 acquires the instance ID "nfi1003" different from the instance ID before the switching as the instance ID after the switching.

The NF execution position switching unit 25 updates execution instance information before the switching to the instance information after the switching in the flow table 41. The NF execution position switching unit 25 issues a delete command with "delete flow_id=002" to delete a row corresponding to the function ID "NF003" in the flow table 41. Additionally, the NF execution position switching unit 25 issues an append command of "append {Condition: "src=(IP (NF003))", Action: "forward pid103"}" to add the new function ID "NF003" to the flow table 41. For example, in the flow table 41, the NF execution position switching unit 25 deletes a flow entry in which the information before the switching is included as Condition, and adds a flow entry in which the information after the switching is included as Condition.

After accepting the command, the flow management unit 28 updates the flow table 41 based on the command. The flow management unit 28 accepts the delete command and deletes the row with flow_id "002" in the flow table 41. Additionally, the flow management unit 28 accepts the append command, and adds a row in which "src=IP (NF003)" is set as Condition, "forward pid103" is set as Action, and flow_id is "00x".

As a result, the NF execution position switching unit 25 switches an execution instance ID from "nfi0003" to "nfi1003". For example, the NF execution position switching unit 25 switches the execution position of NF "NF003" of the application App3 having the smallest load from the embedded CPU 941 to the CPU 19.

Therefore, when the smart NIC 94 is overloaded, the information processing apparatus (Host) 1 temporarily uses the CPU 91 of the Host to execute the NF, so that degradation in network performance may be avoided, and network performance may be maintained at high quality. For example, even in a case where the information processing apparatus (Host) 1 offloads the NF to the smart NIC 94, the CPU resources of the Host and the smart NIC 94 may be efficiently used by using the Host as an executing destination of the NF while checking availability of the CPU 91 of the Host in accordance with the communication status.

[Flowchart of Communication Statistics Processing Unit]

Figure 15:
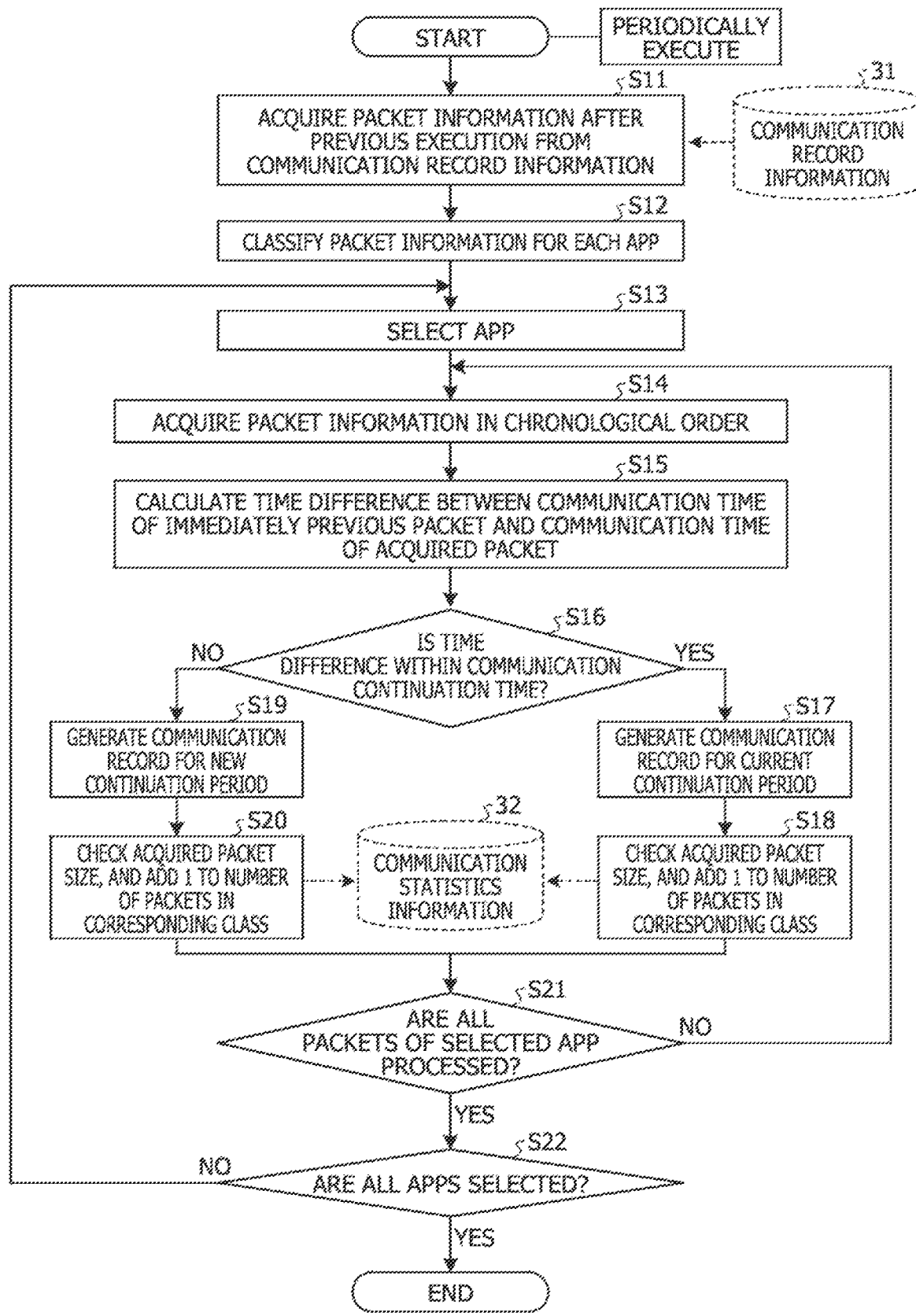
FIG. 15 is a flowchart illustrating an example of a communication statistics processing unit according to the embodiment.

FIG. 15 is a flowchart illustrating an example of a communication statistics processing unit according to the embodiment. It is assumed that the communication statistics processing unit 22 is a unit that is periodically executed. In FIG. 15, an application is abbreviated as an "app".

The communication statistics processing unit 22 acquires packet information after the previous execution from the communication record information 31 (step S11). The communication statistics processing unit 22 classifies the packet information for each app (destination IP) (step S12). The communication statistics processing unit 22 selects an app (step S13).

For the selected app, the communication statistics processing unit 22 acquires packet information in chronological order (step S14). The communication statistics processing unit 22 calculates a time difference between a communication time of the immediately previous packet and a communication time of the acquired packet (step S15). The communication statistics processing unit 22 determines whether or not the time difference is within a communication continuation time (step S16). The communication continuation time is, for example, 5 seconds.

In a case where it is determined that the time difference is within the communication continuation time (Yes in step S16), the communication statistics processing unit 22 generates a communication record of the current continuation period for the communication statistics information 32 (step S17). The communication statistics processing unit 22 checks a size of the acquired packet, and adds 1 to the number of packets of the corresponding class (step S18). The communication statistics processing unit 22 proceeds to step S21.

By contrast, in a case where it is determined that the time difference is not within the communication continuation time (No in step S16), the communication statistics processing unit 22 generates a communication record of a new continuation period for the communication statistics information 32 (step S19). The communication statistics processing unit 22 checks a size of the acquired packet, and adds 1 to the number of packets of the corresponding class (step S20). The communication statistics processing unit 22 proceeds to step S21.

In step S21, the communication statistics processing unit 22 determines whether or not all packets of the selected app are processed (step S21). In a case where it is determined that all the packets of the selected app are not processed (No in step S21), the communication statistics processing unit 22 proceeds to step S14 to process the next packet.

By contrast, in a case where it is determined that all the packets of the selected app are processed (Yes in step S21), the communication statistics processing unit 22 determines whether or not all apps are selected (step S22). In a case where it is determined that all the apps are not selected (No in step S22), the communication statistics processing unit 22 proceeds to step S13 to select the next app. By contrast, in a case where it is determined that all the apps are selected (Yes in step S22), the communication statistics processing unit 22 ends the communication statistics processing.

[Flowchart of Overload Determination Unit]

Figure 16:
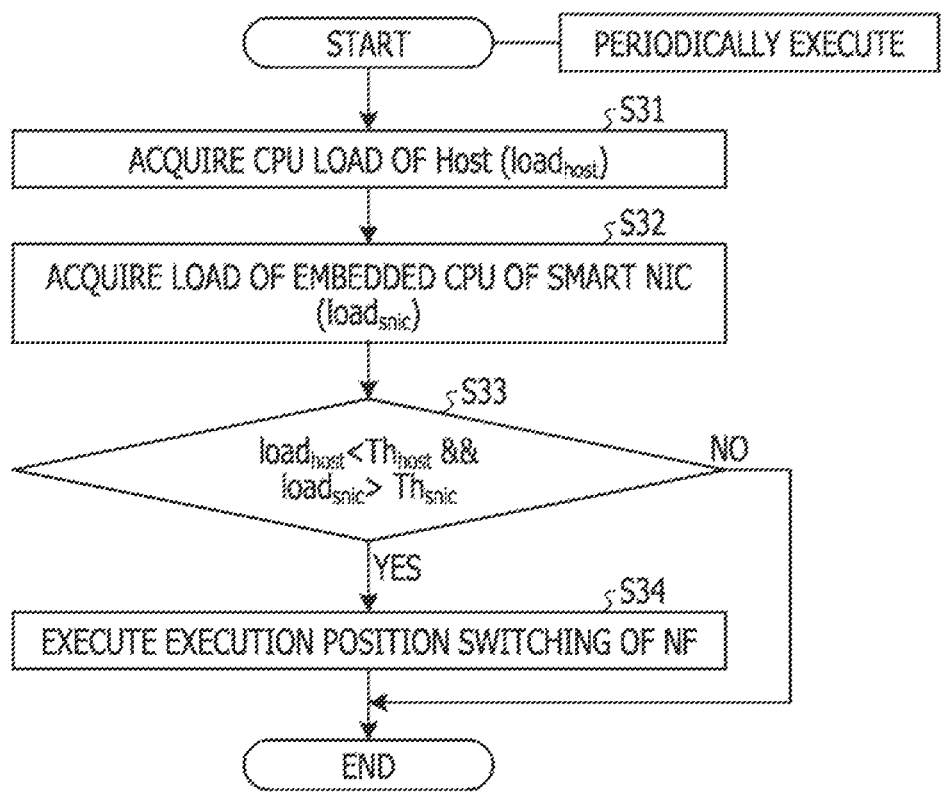
FIG. 16 is a flowchart illustrating an example of an overload determination unit according to the embodiment.

FIG. 16 is a flowchart illustrating an example of an overload determination unit according to the embodiment. It is assumed that the overload determination unit 23 is a unit that is periodically executed.

The overload determination unit 23 acquires a load on the CPU 91 of the Host (step S32). The overload determination unit 23 sets the acquired load on the CPU 91 to the load$_{host}$. The load on the CPU 91 is measured by the CPU load measurement unit 11. The overload determination unit 23 acquires a load on the embedded CPU 941 of the smart NIC 94 (step S31). The overload determination unit 23 sets the acquired load on the embedded CPU 941 as the load$_{snic}$. The load on the embedded CPU 941 is measured by the CPU load measurement unit 26.

The overload determination unit 23 determines whether or not the load load$_{host}$ of the CPU 91 is smaller than the first threshold value Th$_{host}$ and the load load$_{snic}$ of the embedded CPU 941 is larger than the second threshold value Th$_{host}$ (step S33). In a case where it is determined that the load load$_{host}$ of the CPU 91 is smaller than the first threshold value Th$_{host}$ and the load load$_{snic}$ of the embedded CPU 941 is larger than the second threshold value Th$_{host}$ (Yes in step S33), the overload determination unit 23 determines that the embedded CPU 941 of the smart NIC 94 is overloaded. The overload determination unit 23 determines that switching of an execution position of the NF is to be performed (step S34). The overload determination unit 23 ends the overload determination processing.

By contrast, in a case where it is determined that the load load$_{host}$ of the CPU 91 is equal to or higher than the first threshold value Th$_{host}$ or the load load$_{snic}$ of the embedded CPU 941 is equal to or lower than the second threshold value Th$_{host}$ (No in step S33), the overload determination unit 23 ends the overload determination processing.

[Flowchart of Switching Target NF Determination Unit]

Figure 17:
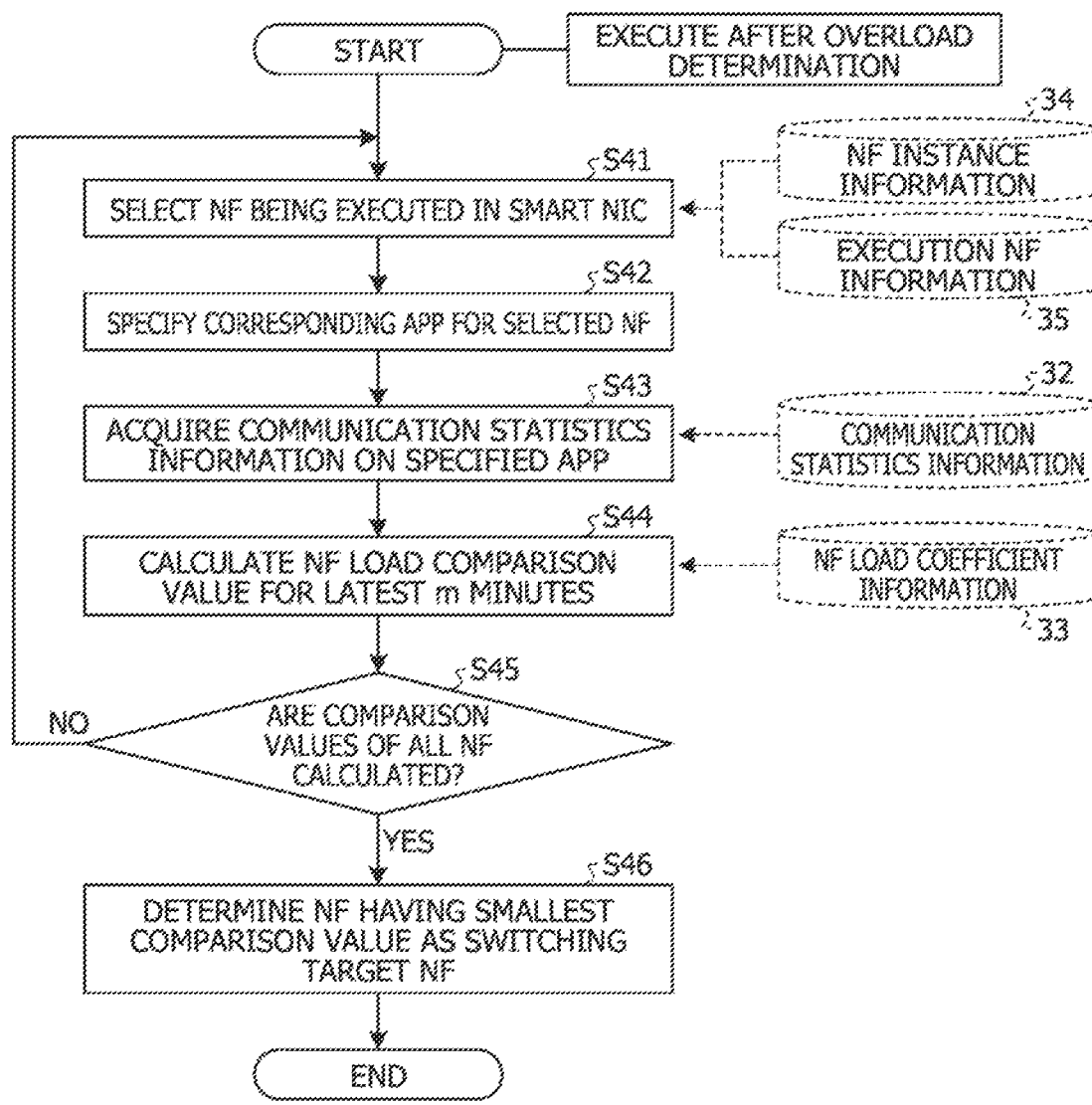
FIG. 17 is a flowchart illustrating an example of a switching target NF determination unit according to the embodiment.

FIG. 17 is a flowchart illustrating an example of a switching target NF determination unit according to the embodiment. It is assumed that the switching target NF determination unit 24 is a unit that is executed after an overload determination by the overload determination unit 23. In FIG. 17, an application is abbreviated as an "app".

By referring to the NF instance information 34 and the execution NF information 35, the switching target NF determination unit 24 selects an NF being executed in the smart NIC 94 (step S41). The switching target NF determination unit 24 specifies an app (target App) corresponding to the selected NF from the execution NF information 35 (step S42).

The switching target NF determination unit 24 acquires communication statistics information on the specified app from the communication statistics information 32 (step S43). By using the acquired communication statistics information and the NF load coefficient information 33, the switching target NF determination unit 24 calculates NF load comparison values for the latest m minutes (step S44). Here, m minutes is 5 minutes, for example. For example, the switching target NF determination unit 24 calculates the NF load comparison value of the selected NF by using Equation (1) and Equation (2) described above.

The switching target NF determination unit 24 determines whether or not the NF load comparison values of all the NFs being executed in the smart NIC 94 are calculated (step S45). In a case where it is determined that the NF load comparison values of all the NFs are not calculated (No in step S45), the switching target NF determination unit 24 proceeds to step S41 to select the next NF.

By contrast, in a case where it is determined that the NF load comparison values of all the NFs are calculated (Yes in step S45), the switching target NF determination unit 24 determines the NF having the smallest NF load comparison value as the switching target NF (step S46). The switching target NF determination unit 24 ends the switching target NF determination processing.

[Flowchart of NF Execution Position Switching Unit]

Figure 18:
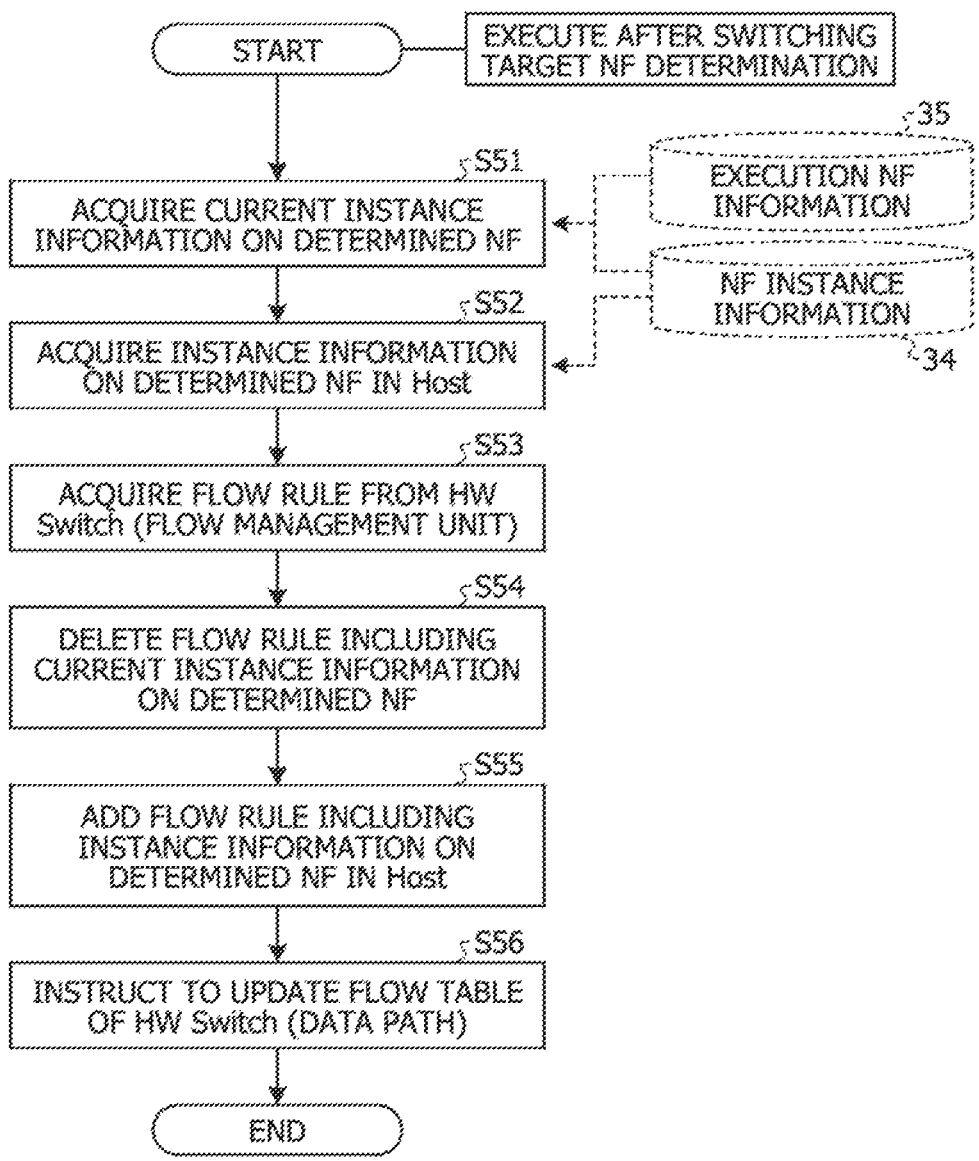
FIG. 18 is a flowchart illustrating an example of an NF execution position switching unit according to the embodiment.
Figure 19:
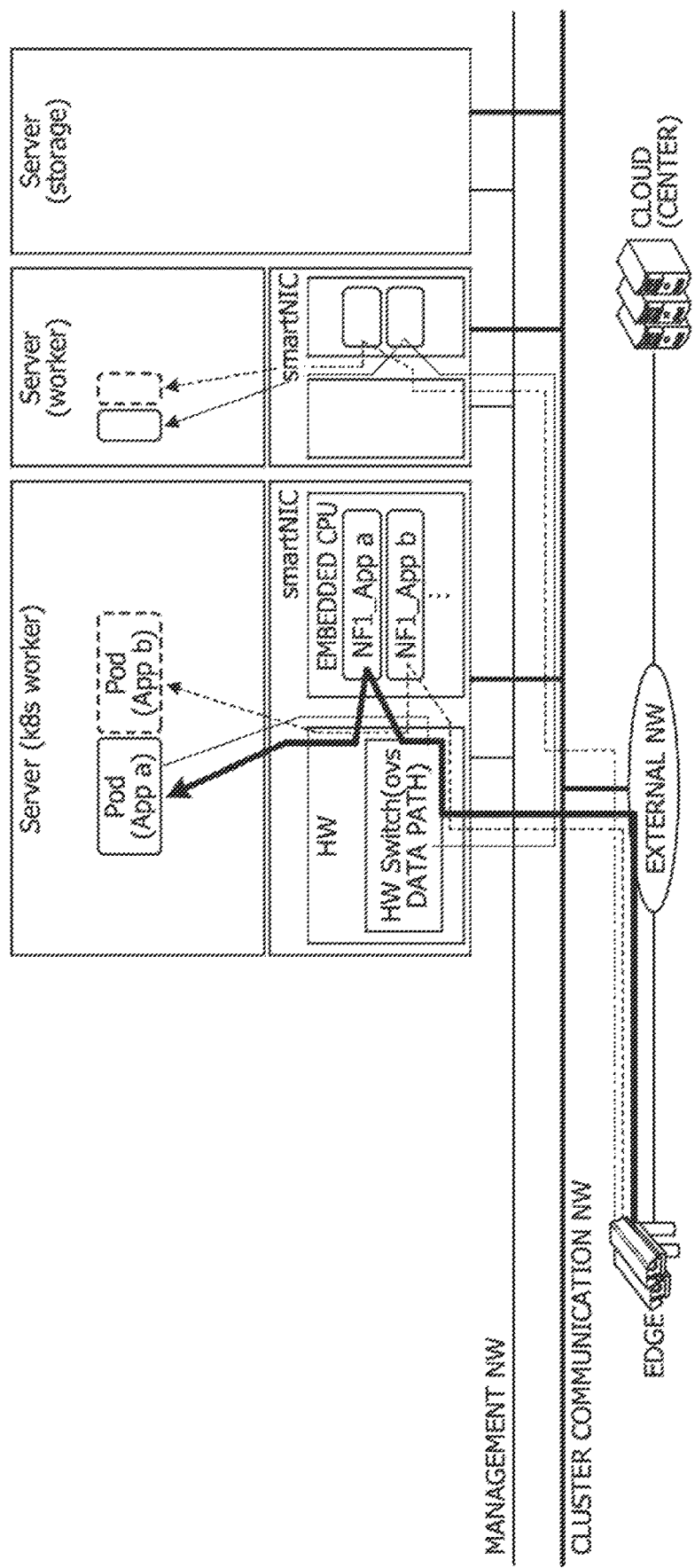
FIG. 19 is a reference diagram illustrating a cluster configuration of a k8s in a composable environment.

FIG. 18 is a flowchart illustrating an example of an NF execution position switching unit according to the embodiment. It is assumed that the NF execution position switching unit 25 is a unit that is executed after the switching target NF determination unit 24 determines a switching target NF.

The NF execution position switching unit 25 acquires current instance information on the NF determined by the switching target NF determination unit 24 from the execution NF information 35 and the NF instance information 34 (step S51). The NF execution position switching unit 25 acquires instance information on the determined NF in the Host from the NF instance information 34 (step S52).

The NF execution position switching unit 25 acquires a flow rule stored in the flow table 41 from the flow management unit 28 (step S53). The NF execution position switching unit 25 deletes a flow rule including the current instance information on the determined NF (step S54). The NF execution position switching unit 25 adds the flow rule including the instance information on the determined NF in the Host (step S55).

The NF execution position switching unit 25 instructs the flow management unit 28 to update the flow table 41 of a data path (step S56). The NF execution position switching unit 25 ends the NF execution position switching processing.

Effects of Embodiment

In this manner, in the embodiment described above, the information processing apparatus 1 in which the smart NIC 94 is mounted records the communication information to each application executed by the information processing apparatus 1 for each application. In a case where the use rate of the embedded CPU 941 is overloaded, based on the record of the communication information, the information processing apparatus 1 compares the loads on the respective network functions that process communication to the respective applications based on the flow rule of the PCIe switch 944. The information processing apparatus 1 selects a network function having the smallest load on each network function. In order to change the flow rule of the PCIe switch 944, the information processing apparatus 1 switches the execution position of the selected network function to the network function in the information processing apparatus 1. Therefore, even when the number of communications increases in the information processing apparatus 1 in which the smart NIC 94 is mounted, it is possible to efficiently use the resources of the CPU 91 in the information processing apparatus 1 and the smart NIC 94 in the embedded CPU 941.

The information processing apparatus 1 compares the loads on the respective network functions for the respective applications based on the type of the network function, and the number of packets, the packet size, and the communication time obtained from the record of the communication information. Therefore, the information processing apparatus 1 may obtain a magnitude of the load on each network function for each application, and may determine the network function as the switching target by comparing the obtained magnitudes of the loads on each network function.

The information processing apparatus 1 calculates a load comparison value based on the number of packets and the continuation time for each packet size obtained from the record of the communication information on continuous communication for the latest certain time, and the load coefficient for the type of the network function used for each packet size, for the load on each network function for each application. The information processing apparatus 1 compares the calculated load comparison values. Therefore, the information processing apparatus 1 may calculate the load comparison value of the load on each network function for each application, and may determine the network function as the switching target by comparing the calculated load comparison values.

In a case where the use rate of the CPU 91 of the information processing apparatus 1 is smaller than the first threshold value and the use rate of the embedded CPU 941 is larger than the second threshold value, the information processing apparatus 1 compares the loads on the respective network functions for the respective applications. Therefore, the information processing apparatus 1 compares the loads on the respective network functions under a condition of the use rate of the CPU 91 and the use rate of the embedded CPU 941, and further determines the network function to be switched to the information processing apparatus 1, so that the CPU resource may be efficiently used. For example, the information processing apparatus 1 may not hinder the processing of each application executed in the CPU 91 by setting the case where the use rate of the information processing apparatus 1 in the CPU 91 is smaller than the first threshold value as a condition.

[Others]

According to the embodiment, it is described that the switching target NF determination unit 24 calculates the NF load comparison value of each NF by using Equation (1) and Equation (2). Meanwhile, without being limited to Equation (1) and Equation (2), the switching target NF determination unit 24 may calculate a value to be used for comparing the loads on the respective NFs. For example, without being limited to the number of packets, the type of the NF, the packet size, and the communication time, the switching target NF determination unit 24 may calculate the NF load comparison value of each NF by using other elements.

Unless otherwise specified, processing procedures, control procedures, specific names, and information including various kinds of data and parameters described in the above-described document or drawings may be optionally changed.

Each component of the apparatus illustrated in the drawings does not have to be physically configured as illustrated. For example, specific forms of dispersion and integration of the apparatuses are not limited to those illustrated in the drawings, and all or part thereof may be configured by being functionally or physically dispersed or integrated in arbitrary units according to various loads, the state of use, and the like. For example, the overload determination unit 23 and the switching target NF determination unit 24 may be integrated as a single unit. The storage unit 30 that stores the communication record information 31 or the like may be coupled via a network as an external apparatus of the information processing apparatus 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a processor; and
a network interface card coupled to the processor, the network interface card comprising:
a network switch; and
a first processor configured to perform processing, the processing including:
recording, for each application of a plurality of applications executed in the processor of the information processing apparatus, communication information indicating a communication destined to the each application;
comparing, in a case where a use rate of the first processor is overloaded, based on the recorded communication information, a load on each of the plurality of network functions executed in the first processor, each of the plurality of network functions being a software process executed in the first processor and configured to process the communication destined to among the plurality of applications a corresponding application indicated by a flow rule of the network switch;
in response to a comparison result obtained by the comparing, selecting, from among the plurality of network functions, a network function having the smallest load; and
switching an execution position of the selected network function from the first processor to the processor of the information processing apparatus by changing the flow rule of the network switch, to thereby cause the processor to execute processing of the selected network function.

2. The information processing apparatus according to claim 1,
wherein the comparing of the load is configured to compare the load on each network function for each application, based on a type of the network function, and the number of packets, a packet size, and a communication time obtained from the record of the communication information.

3. The information processing apparatus according to claim 2,
wherein the comparing of the load is configured to calculate, for the load on each network function for each application, a load comparison value based on the number of packets and a continuation time for each packet size obtained from the record of the communication information on continuous communication for the latest certain time, and a load coefficient for the type of network function used for each packet size, and compares the calculated load comparison value.

4. The information processing apparatus according to claim 1,
wherein the comparing of the load is configured to compare, in response that a use rate of a second processor of the information processing apparatus is smaller than a first threshold value and a use rate of the first processor is larger than a second threshold value, the load on each network function for each application.

5. A non-transitory computer-readable recording medium storing an overload control program for causing a network interface card coupled to a computer to execute processing, the network interface card including a first processor and a network switch, the computer including a processor, the processing comprising:
recording, by the first processor of the network interface card, for each application of a plurality of applications executed in the processor of the computer, communication information indicating a communication destined to the each application;
comparing, in a case where a use rate of the first processor is overloaded, based on the recorded communication information, a load on each of the plurality of network functions executed in the first processor, each of the plurality of network functions being a software process executed in the first processor and configured to process the communication destined to among the plurality of applications a corresponding application indicated by a flow rule of the network switch;
in response to a comparison result obtained by the comparing, selecting, by the first processor of the network interface card, from among the plurality of network functions, a network function having the smallest load; and
switching an execution position of the selected network function from the first processor to the processor of the computer by changing the flow rule of the network switch, to thereby cause the processor to execute processing of the selected network function.

6. A computer-implemented overload control method performed by a network interface card coupled to a computer, the network interface card including a network switch and a first processor, the computer including a processor, the method comprising:
recording, by the first processor of the network interface card, for each application of a plurality of applications executed in the processor of the computer, communication information indicating a communication destined to the each application;
comparing, in a case where a use rate of the first processor is overloaded, based on the recorded communication information, a load on each of the plurality of network functions executed in the first processor, each of the plurality of network functions being a software process executed in the first processor and configured to process the communication destined to among the plurality of applications a corresponding application indicated by a flow rule of the network switch;
in response to a comparison result obtained by the comparing, selecting, by the first processor of the network interface card, from among the plurality of network functions, a network function having the smallest load; and
switching an execution position of the selected network function from the first processor to the processor of the computer by changing the flow rule of the network switch, to thereby cause the processor to execute processing of the selected network function.

* * * * *